(12) United States Patent
Eitschberger et al.

(10) Patent No.: US 11,648,513 B2
(45) Date of Patent: May 16, 2023

(54) DETONATOR POSITIONING DEVICE

(71) Applicant: DynaEnergetics GmbH & Co. KG, Troisdorf (DE)

(72) Inventors: Christian Eitschberger, Munich (DE); Gernot Uwe Burmeister, Austin, TX (US); Thomas Keller Bradfield, Austin, TX (US); Frank Haron Preiss, Bonn (DE); Thilo Scharf, Letterkenny (IE); Liam McNelis, Bonn (DE)

(73) Assignee: DynaEnergetics Europe GmbH, Troisdorf (DE)

( * ) Notice: Subject to any disclaimer, the term of this patent is extended or adjusted under 35 U.S.C. 154(b) by 0 days.

(21) Appl. No.: 16/540,484

(22) Filed: Aug. 14, 2019

(65) Prior Publication Data
US 2019/0366272 A1 Dec. 5, 2019

Related U.S. Application Data

(60) Continuation of application No. 16/026,431, filed on Jul. 3, 2018, now Pat. No. 10,507,433, and a
(Continued)

(30) Foreign Application Priority Data

Jul. 18, 2013 (CA) ..................................... 2821506

(51) Int. Cl.
*E21B 43/117* (2006.01)
*B01D 65/08* (2006.01)
(Continued)

(52) U.S. Cl.
CPC ............. *B01D 65/08* (2013.01); *B01D 61/20* (2013.01); *B01D 63/021* (2013.01);
(Continued)

(58) Field of Classification Search
CPC .... F42B 3/103; F42B 3/26; F42D 1/00; F42D 1/02; F42D 1/04; F42D 1/041;
(Continued)

(56) References Cited

U.S. PATENT DOCUMENTS 2,216,359 A 10/1940 Spencer
2,228,873 A 1/1941 Hardt et al.
(Continued)

FOREIGN PATENT DOCUMENTS

CA 2003166 A1 5/1991
CA 2821506 A1 1/2015
(Continued)

OTHER PUBLICATIONS

US 11,274,530 B2, 03/2022, Eitschberger et al. (withdrawn)
(Continued)

*Primary Examiner* — Joshua E Freeman
*Assistant Examiner* — Benjamin S Gomberg
(74) *Attorney, Agent, or Firm* — Moyles IP, LLC

(57) ABSTRACT

A detonator positioning device for use with a detonator in a perforating gun assembly is described. The detonator positioning device is configured for electrically contactably forming an electrical connection within the perforating gun housing by contact. The detonator positioning device includes a body having a first end, a second end, and a central bore extending between the first and second ends. The central bore is adapted for receiving one or more electrically contactable components of a detonator. The detonator positioning device aligns at least one of the one or more electrically contactable components to form an electrical connection with a bulkhead assembly.

17 Claims, 7 Drawing Sheets

Related U.S. Application Data continuation-in-part of application No. 15/920,812, filed on Mar. 14, 2018, now Pat. No. 11,125,056, which is a continuation of application No. 15/617,344, filed on Jun. 8, 2017, now Pat. No. 10,429,161, which is a division of application No. 15/287,309, filed on Oct. 6, 2016, now Pat. No. 9,702,680, said application No. 16/026,431 is a continuation of application No. 15/117,228, filed as application No. PCT/US2015/018906 on Mar. 5, 2015, now Pat. No. 10,188,990, said application No. 15/287,309 is a division of application No. 14/904,788, filed as application No. PCT/CA2014/050673 on Jul. 16, 2014, now Pat. No. 9,494,021.

(60) Provisional application No. 61/949,939, filed on Mar. 7, 2014.

(51) Int. Cl.
  *B01D 61/20* (2006.01)
  *B01D 63/02* (2006.01)
  *B01D 63/04* (2006.01)
  *B01D 65/00* (2006.01)
  *E21B 43/119* (2006.01)

(52) U.S. Cl.
  CPC ........... *B01D 63/046* (2013.01); *B01D 65/00* (2013.01); *E21B 43/117* (2013.01); *E21B 43/119* (2013.01); *B01D 2313/02* (2013.01); *B01D 2313/025* (2013.01); *B01D 2313/20* (2013.01); *B01D 2313/21* (2013.01); *B01D 2313/26* (2013.01); *B01D 2313/44* (2013.01); *B01D 2313/54* (2013.01); *B01D 2313/56* (2013.01); *B01D 2315/06* (2013.01); *B01D 2317/04* (2013.01); *B01D 2321/185* (2013.01)

(58) Field of Classification Search
  CPC . F42D 1/043; F42D 1/045; F42D 1/22; E21B 43/11; E21B 43/116; E21B 43/1185; E21B 43/117; E21B 43/119
  USPC ............. 89/1.15–1.151; 102/275.11, 275.12, 102/202.5, 202.9, 202.11, 202.12, 301, 102/304, 313, 314, 321, 331
  See application file for complete search history.

(56) References Cited

U.S. PATENT DOCUMENTS

| | | | |
|---|---|---|---|
| 2,326,406 A | 8/1943 | Lloyd | |
| 2,358,466 A | 9/1944 | Miller | |
| 2,418,486 A | 4/1947 | Smylie | |
| 2,543,814 A | 3/1951 | Thompson et al. | |
| 2,598,651 A | 5/1952 | Spencer | |
| 2,637,402 A | 5/1953 | Baker et al. | |
| 2,640,547 A | 6/1953 | Baker et al. | |
| 2,649,046 A | 8/1953 | Oliver | |
| 2,655,993 A | 10/1953 | Lloyd | |
| 2,692,023 A * | 10/1954 | Conrad | E21B 23/065 166/63 |
| 2,734,456 A | 2/1956 | Sweetman | |
| 2,785,631 A | 3/1957 | Blanchard | |
| 2,889,775 A * | 6/1959 | Owen | E21B 43/117 175/4.6 |
| 2,946,283 A | 7/1960 | Udry | |
| RE25,407 E | 6/1963 | Lebourg | |
| 3,158,680 A | 11/1964 | Lovitt et al. | |
| 3,170,400 A | 2/1965 | Nelson | |
| 3,173,992 A * | 3/1965 | Boop | H01B 17/306 174/151 |
| RE25,846 E | 8/1965 | Campbell | |
| 3,246,707 A * | 4/1966 | Bell | E21B 43/117 175/4.54 |
| 3,264,989 A | 8/1966 | Rucker | |
| 3,264,994 A | 8/1966 | Kurt | |
| 3,374,735 A | 3/1968 | Moore | |
| 3,415,321 A | 12/1968 | Venghiattis | |
| 3,504,723 A | 4/1970 | Cushman et al. | |
| 3,565,188 A | 2/1971 | Hakala | |
| 3,859,921 A | 1/1975 | Stephenson | |
| 4,007,790 A | 2/1977 | Henning | |
| 4,007,796 A * | 2/1977 | Boop | E21B 43/1185 175/4.55 |
| 4,039,239 A | 8/1977 | Cobaugh et al. | |
| 4,058,061 A | 11/1977 | Mansur, Jr. et al. | |
| 4,080,902 A | 3/1978 | Goddard et al. | |
| 4,107,453 A | 8/1978 | Erixon | |
| 4,132,171 A | 1/1979 | Pawlak et al. | |
| 4,140,188 A | 2/1979 | Vann | |
| 4,172,421 A | 10/1979 | Regalbuto | |
| 4,182,216 A | 1/1980 | DeCaro | |
| 4,191,265 A | 3/1980 | Bosse-Platiere | |
| 4,208,966 A | 6/1980 | Hart | |
| 4,216,721 A | 8/1980 | Marziano et al. | |
| 4,234,768 A * | 11/1980 | Boop | E21B 43/1185 200/82 R |
| 4,261,263 A | 4/1981 | Coultas et al. | |
| 4,266,613 A | 5/1981 | Boop | |
| 4,290,486 A | 9/1981 | Regalbuto | |
| 4,306,628 A | 12/1981 | Adams, Jr. et al. | |
| 4,312,273 A | 1/1982 | Camp | |
| 4,319,526 A | 3/1982 | DerMott | |
| 4,363,529 A | 12/1982 | Loose | |
| 4,485,741 A | 12/1984 | Moore et al. | |
| 4,491,185 A | 1/1985 | McClure | |
| 4,496,008 A | 1/1985 | Pottier et al. | |
| 4,512,418 A | 4/1985 | Regalbuto et al. | |
| 4,523,650 A | 6/1985 | Sehnert et al. | |
| 4,534,423 A | 8/1985 | Regalbuto | |
| 4,541,486 A | 9/1985 | Wetzel et al. | |
| 4,574,892 A | 3/1986 | Grigar et al. | |
| 4,576,233 A | 3/1986 | George | |
| 4,598,775 A | 7/1986 | Vann et al. | |
| 4,609,057 A | 9/1986 | Walker et al. | |
| 4,621,396 A | 11/1986 | Walker et al. | |
| 4,629,001 A | 12/1986 | Miller et al. | |
| 4,650,009 A | 3/1987 | McClure et al. | |
| 4,657,089 A | 4/1987 | Stout | |
| 4,660,910 A | 4/1987 | Sharp et al. | |
| 4,730,793 A | 3/1988 | Thurber, Jr. et al. | |
| 4,744,424 A | 5/1988 | Lendermon et al. | |
| 4,747,201 A | 5/1988 | Donovan et al. | |
| 4,753,170 A | 6/1988 | Regalbuto et al. | |
| 4,756,363 A | 7/1988 | Lanmon et al. | |
| 4,762,067 A | 8/1988 | Barker et al. | |
| 4,769,734 A | 9/1988 | Heinemeyer et al. | |
| 4,776,393 A | 10/1988 | Forehand et al. | |
| 4,790,383 A | 12/1988 | Savage et al. | |
| 4,800,815 A | 1/1989 | Appledorn et al. | |
| 4,852,494 A | 8/1989 | Williams | |
| 4,869,171 A | 9/1989 | Abouav | |
| 4,889,183 A | 12/1989 | Sommers et al. | |
| 4,986,183 A | 1/1991 | Jacob et al. | |
| 5,001,981 A | 3/1991 | Shaw | |
| 5,006,833 A | 4/1991 | Marlowe et al. | |
| 5,027,708 A | 7/1991 | Gonzalez et al. | |
| 5,038,682 A | 8/1991 | Marsden | |
| 5,052,489 A | 10/1991 | Carisella et al. | |
| 5,060,573 A * | 10/1991 | Montgomery | E21B 29/02 102/202.5 |
| 5,070,788 A | 12/1991 | Carisella et al. | |
| 5,088,413 A | 2/1992 | Huber | |
| 5,105,742 A | 4/1992 | Sumner | |
| 5,119,729 A | 6/1992 | Nguyen | |
| 5,155,293 A * | 10/1992 | Barton | E21B 43/1185 102/306 |
| 5,155,296 A | 10/1992 | Michaluk | |
| 5,159,145 A | 10/1992 | Carisella et al. | |
| 5,159,146 A | 10/1992 | Carisella et al. | |
| 5,204,491 A | 4/1993 | Aureal et al. | |

(56) References Cited

U.S. PATENT DOCUMENTS

| | | |
|---|---|---|
| 5,216,197 A | 6/1993 | Huber et al. |
| 5,241,891 A | 9/1993 | Hayes et al. |
| 5,322,019 A | 6/1994 | Hyland |
| 5,347,929 A | 9/1994 | Lerche et al. |
| 5,358,418 A | 10/1994 | Carmichael |
| 5,392,851 A | 2/1995 | Arend |
| 5,392,860 A | 2/1995 | Ross |
| 5,436,791 A * | 7/1995 | Turano ............... E21B 43/1185 102/218 |
| 5,503,077 A | 4/1996 | Motley |
| 5,571,986 A | 11/1996 | Snider et al. |
| 5,603,384 A | 2/1997 | Bethel et al. |
| 5,648,635 A | 7/1997 | Lussier et al. |
| 5,671,899 A | 9/1997 | Nicholas et al. |
| 5,703,319 A | 12/1997 | Fritz et al. |
| 5,756,926 A | 5/1998 | Bonbrake et al. |
| 5,775,426 A | 7/1998 | Snider et al. |
| 5,778,979 A | 7/1998 | Burleson et al. |
| 5,785,130 A | 7/1998 | Wesson et al. |
| 5,816,343 A | 10/1998 | Markel et al. |
| 5,820,402 A | 10/1998 | Chiacchio et al. |
| 5,823,266 A | 10/1998 | Burleson et al. |
| 5,837,925 A | 11/1998 | Nice |
| 5,911,277 A | 6/1999 | Hromas et al. |
| 5,984,006 A | 11/1999 | Read et al. |
| 5,992,289 A | 11/1999 | George et al. |
| 6,006,833 A | 12/1999 | Burleson et al. |
| 6,012,525 A | 1/2000 | Burleson et al. |
| 6,085,659 A | 7/2000 | Beukes et al. |
| 6,112,666 A | 9/2000 | Murray et al. |
| 6,148,263 A | 11/2000 | Brooks et al. |
| 6,173,651 B1 | 1/2001 | Pathe et al. |
| 6,263,283 B1 | 7/2001 | Snider et al. |
| 6,298,915 B1 | 10/2001 | George |
| 6,305,287 B1 | 10/2001 | Capers et al. |
| 6,333,699 B1 | 12/2001 | Zierolf |
| 6,354,374 B1 | 3/2002 | Edwards et al. |
| 6,385,031 B1 | 5/2002 | Lerche et al. |
| 6,386,108 B1 | 5/2002 | Brooks et al. |
| 6,408,758 B1 | 6/2002 | Duguet |
| 6,412,388 B1 | 7/2002 | Frazier |
| 6,412,415 B1 | 7/2002 | Kothari et al. |
| 6,418,853 B1 | 7/2002 | Duguet et al. |
| 6,419,044 B1 | 7/2002 | Tite et al. |
| 6,439,121 B1 | 8/2002 | Gillingham |
| 6,467,415 B2 | 10/2002 | Menzel et al. |
| 6,474,931 B1 | 11/2002 | Austin et al. |
| 6,487,973 B1 | 12/2002 | Gilbert, Jr. et al. |
| 6,497,285 B2 | 12/2002 | Walker |
| 6,508,176 B1 | 1/2003 | Badger et al. |
| 6,582,251 B1 | 6/2003 | Burke et al. |
| 6,618,237 B2 | 9/2003 | Eddy et al. |
| 6,651,747 B2 | 11/2003 | Chen et al. |
| 6,659,180 B2 | 12/2003 | Moss |
| 6,702,009 B1 | 3/2004 | Drury et al. |
| 6,719,061 B2 | 4/2004 | Muller et al. |
| 6,739,265 B1 | 5/2004 | Badger et al. |
| 6,742,602 B2 * | 6/2004 | Trotechaud ......... E21B 43/1185 175/4.54 |
| 6,752,083 B1 | 6/2004 | Lerche |
| 6,773,312 B2 | 8/2004 | Bauer et al. |
| 6,779,605 B2 | 8/2004 | Jackson |
| 6,843,317 B2 | 1/2005 | Mackenzie |
| 6,851,471 B2 | 2/2005 | Barlow et al. |
| 6,918,334 B2 | 7/2005 | Trotechaud |
| 6,938,689 B2 | 9/2005 | Farrant et al. |
| 7,013,977 B2 | 3/2006 | Nordaas |
| 7,044,230 B2 | 5/2006 | Starr et al. |
| 7,066,261 B2 | 6/2006 | Vicente et al. |
| 7,093,664 B2 | 8/2006 | Todd et al. |
| 7,107,908 B2 | 9/2006 | Forman et al. |
| 7,168,494 B2 | 1/2007 | Starr et al. |
| 7,182,625 B2 | 2/2007 | Machado et al. |
| 7,193,527 B2 | 3/2007 | Hall |
| 7,234,521 B2 * | 6/2007 | Shammai ............... E21B 49/081 166/264 |
| 7,237,626 B2 | 7/2007 | Gurjar et al. |
| 7,243,722 B2 | 7/2007 | Oosterling et al. |
| 7,278,491 B2 | 10/2007 | Scott |
| 7,306,038 B2 | 12/2007 | Challacombe |
| 7,347,278 B2 | 3/2008 | Lerche et al. |
| 7,347,279 B2 | 3/2008 | Li et al. |
| 7,353,879 B2 | 4/2008 | Todd et al. |
| 7,357,083 B2 | 4/2008 | Takahara et al. |
| 7,364,451 B2 | 4/2008 | Ring et al. |
| 7,387,162 B2 | 6/2008 | Mooney, Jr. et al. |
| 7,441,601 B2 | 10/2008 | George et al. |
| 7,493,945 B2 | 2/2009 | Doane et al. |
| 7,510,017 B2 | 3/2009 | Howell et al. |
| 7,540,758 B2 | 6/2009 | Ho |
| 7,568,429 B2 | 8/2009 | Hummel et al. |
| 7,588,080 B2 | 9/2009 | McCoy |
| 7,591,212 B2 | 9/2009 | Myers, Jr. et al. |
| 7,640,857 B2 | 1/2010 | Kneisl |
| 7,726,396 B2 | 6/2010 | Briquet et al. |
| 7,735,578 B2 | 6/2010 | Loehr et al. |
| 7,752,971 B2 | 7/2010 | Loehr |
| 7,762,172 B2 | 7/2010 | Li et al. |
| 7,762,331 B2 * | 7/2010 | Goodman ............... E21B 43/117 166/299 |
| 7,762,351 B2 | 7/2010 | Vidal |
| 7,775,279 B2 | 8/2010 | Marya et al. |
| 7,778,006 B2 | 8/2010 | Stewart et al. |
| 7,789,153 B2 | 9/2010 | Prinz et al. |
| 7,810,430 B2 | 10/2010 | Chan et al. |
| 7,901,247 B2 | 3/2011 | Ring |
| 7,908,970 B1 | 3/2011 | Jakaboski et al. |
| 7,929,270 B2 | 4/2011 | Hummel et al. |
| 7,934,453 B2 | 5/2011 | Moore |
| 7,980,874 B2 | 7/2011 | Finke et al. |
| 8,028,624 B2 | 10/2011 | Mattson |
| 8,066,083 B2 | 11/2011 | Hales et al. |
| 8,069,789 B2 | 12/2011 | Hummel et al. |
| 8,074,737 B2 | 12/2011 | Hill et al. |
| 8,079,296 B2 | 12/2011 | Barton et al. |
| 8,091,477 B2 | 1/2012 | Brooks et al. |
| 8,127,846 B2 | 3/2012 | Hill et al. |
| 8,136,439 B2 | 3/2012 | Bell |
| 8,141,434 B2 | 3/2012 | Kippersund et al. |
| 8,151,882 B2 | 4/2012 | Grigar et al. |
| 8,157,022 B2 | 4/2012 | Bertoja et al. |
| 8,181,718 B2 | 5/2012 | Burleson et al. |
| 8,182,212 B2 | 5/2012 | Parcell |
| 8,186,259 B2 | 5/2012 | Burleson et al. |
| 8,230,788 B2 | 7/2012 | Brooks et al. |
| 8,256,337 B2 | 9/2012 | Hill |
| 8,388,374 B2 | 3/2013 | Grek et al. |
| 8,395,878 B2 | 3/2013 | Stewart et al. |
| 8,413,727 B2 | 4/2013 | Holmes |
| 8,451,137 B2 | 5/2013 | Bonavides et al. |
| 8,468,944 B2 | 6/2013 | Givens et al. |
| 8,576,090 B2 | 11/2013 | Lerche et al. |
| 8,596,378 B2 | 12/2013 | Mason et al. |
| 8,661,978 B2 * | 3/2014 | Backhus ................. F42B 3/121 102/202.3 |
| 8,678,666 B2 | 3/2014 | Scadden et al. |
| 8,689,868 B2 | 4/2014 | Lerche et al. |
| 8,695,506 B2 | 4/2014 | Lanclos |
| 8,746,144 B2 | 6/2014 | Givens et al. |
| 8,807,003 B2 | 8/2014 | Le et al. |
| 8,833,441 B2 | 9/2014 | Fielder et al. |
| 8,863,665 B2 * | 10/2014 | DeVries ................. F41A 19/69 102/206 |
| 8,869,887 B2 | 10/2014 | Deere et al. |
| 6,875,787 B2 | 11/2014 | Tassaroli |
| 8,875,787 B2 * | 11/2014 | Tassaroli ............... E21B 43/1185 166/297 |
| 8,875,796 B2 | 11/2014 | Hales et al. |
| 8,881,816 B2 | 11/2014 | Glenn et al. |
| 8,884,778 B2 | 11/2014 | Lerche et al. |
| 8,943,943 B2 | 2/2015 | Tassaroli |
| 8,960,093 B2 | 2/2015 | Preiss et al. |
| 8,991,489 B2 | 3/2015 | Redlinger et al. |

(56) References Cited

U.S. PATENT DOCUMENTS

| | | |
|---|---|---|
| 9,080,433 B2 | 7/2015 | Lanclos et al. |
| 9,145,764 B2 | 9/2015 | Burton et al. |
| 9,181,790 B2 * | 11/2015 | Mace .................... F23Q 21/00 |
| 9,194,219 B1 | 11/2015 | Hardesty et al. |
| 9,206,675 B2 | 12/2015 | Hales et al. |
| 9,284,168 B2 | 3/2016 | Mau et al. |
| 9,284,819 B2 | 3/2016 | Tolman et al. |
| 9,284,824 B2 | 3/2016 | Fadul et al. |
| 9,317,038 B2 | 4/2016 | Ozick et al. |
| 9,347,755 B2 * | 5/2016 | Backhus ................. F42B 3/182 |
| 9,359,863 B2 | 6/2016 | Streich et al. |
| 9,383,237 B2 | 7/2016 | Wiklund et al. |
| 9,476,289 B2 | 10/2016 | Wells |
| 9,494,021 B2 | 11/2016 | Parks et al. |
| 9,523,265 B2 | 12/2016 | Upchurch et al. |
| 9,556,676 B2 | 1/2017 | Konduc et al. |
| 9,581,422 B2 | 2/2017 | Preiss et al. |
| 9,587,439 B2 | 3/2017 | Lamik-Thonhauser et al. |
| 9,598,942 B2 | 3/2017 | Wells et al. |
| 9,605,937 B2 | 3/2017 | Eitschberger et al. |
| 9,677,363 B2 | 6/2017 | Schacherer et al. |
| 9,689,223 B2 | 6/2017 | Schacherer et al. |
| 9,702,211 B2 | 7/2017 | Tinnen |
| 9,732,561 B2 | 8/2017 | Carter, Jr. |
| 9,874,083 B2 * | 1/2018 | Logan ................. E21B 33/0385 |
| 9,903,192 B2 | 2/2018 | Entchev et al. |
| 10,047,592 B2 | 8/2018 | Burgos et al. |
| 10,077,626 B2 | 9/2018 | Xu et al. |
| 10,077,641 B2 | 9/2018 | Rogman et al. |
| 10,138,691 B2 | 11/2018 | Kos et al. |
| 10,190,398 B2 | 1/2019 | Goodman et al. |
| 10,196,868 B2 | 2/2019 | Layden |
| 10,208,573 B2 | 2/2019 | Kaenel et al. |
| 10,287,873 B2 | 5/2019 | Filas et al. |
| 10,352,136 B2 | 7/2019 | Goyeneche |
| 10,352,144 B2 | 7/2019 | Entchev et al. |
| 10,472,938 B2 | 11/2019 | Parks et al. |
| D873,373 S | 1/2020 | Hartman et al. |
| 10,794,122 B2 | 10/2020 | Kitchen et al. |
| 10,844,696 B2 | 11/2020 | Eitschberger et al. |
| 10,845,178 B2 | 11/2020 | Eitschberger et al. |
| 11,306,556 B2 | 4/2022 | Price |
| 2002/0020320 A1 | 2/2002 | Lebaudy et al. |
| 2002/0062991 A1 | 5/2002 | Farrant et al. |
| 2003/0000411 A1 | 1/2003 | Cernocky et al. |
| 2003/0001753 A1 | 1/2003 | Cernocky et al. |
| 2004/0141279 A1 | 7/2004 | Amano et al. |
| 2004/0211862 A1 | 10/2004 | Elam |
| 2005/0178282 A1 | 8/2005 | Brooks et al. |
| 2005/0183610 A1 | 8/2005 | Barton et al. |
| 2005/0186823 A1 | 8/2005 | Ring et al. |
| 2005/0194146 A1 | 9/2005 | Barker et al. |
| 2005/0218260 A1 | 10/2005 | Corder et al. |
| 2005/0229805 A1 | 10/2005 | Myers, Jr. et al. |
| 2005/0257710 A1 | 11/2005 | Monetti et al. |
| 2007/0084336 A1 | 4/2007 | Neves |
| 2007/0125540 A1 | 6/2007 | Gerez et al. |
| 2007/0158071 A1 | 7/2007 | Mooney et al. |
| 2008/0047456 A1 | 2/2008 | Li et al. |
| 2008/0047716 A1 | 2/2008 | McKee et al. |
| 2008/0110612 A1 | 5/2008 | Prinz et al. |
| 2008/0134922 A1 | 6/2008 | Grattan et al. |
| 2008/0149338 A1 * | 6/2008 | Goodman ............. E21B 43/117 166/299 |
| 2008/0173204 A1 | 7/2008 | Anderson et al. |
| 2008/0264639 A1 | 10/2008 | Parrott et al. |
| 2009/0050322 A1 | 2/2009 | Hill et al. |
| 2009/0159285 A1 | 6/2009 | Goodman |
| 2009/0272519 A1 | 11/2009 | Green et al. |
| 2009/0272529 A1 | 11/2009 | Crawford |
| 2009/0301723 A1 | 12/2009 | Gray |
| 2010/0000789 A1 | 1/2010 | Barton et al. |
| 2010/0012774 A1 | 1/2010 | Fanucci et al. |
| 2010/0089643 A1 | 4/2010 | Vidal |
| 2010/0096131 A1 | 4/2010 | Hill et al. |
| 2010/0107917 A1 | 5/2010 | Moser |
| 2010/0163224 A1 | 7/2010 | Strickland |
| 2010/0230104 A1 | 9/2010 | Nölke et al. |
| 2010/0247771 A1 | 9/2010 | Kobayashi et al. |
| 2010/0286800 A1 | 11/2010 | Lerche et al. |
| 2011/0024116 A1 | 2/2011 | McCann et al. |
| 2011/0042069 A1 | 2/2011 | Bailey et al. |
| 2011/0301784 A1 | 12/2011 | Oakley et al. |
| 2012/0006217 A1 | 1/2012 | Anderson |
| 2012/0085538 A1 | 4/2012 | Guerrero et al. |
| 2012/0094553 A1 | 4/2012 | Fujiwara et al. |
| 2012/0160483 A1 | 6/2012 | Carisella |
| 2012/0199031 A1 | 8/2012 | Lanclos |
| 2012/0199352 A1 * | 8/2012 | Lanclos .................. F42D 1/05 166/297 |
| 2012/0241169 A1 | 9/2012 | Hales et al. |
| 2012/0242135 A1 | 9/2012 | Thomson et al. |
| 2012/0247769 A1 | 10/2012 | Schacherer et al. |
| 2012/0247771 A1 * | 10/2012 | Black ................. E21B 43/1185 166/297 |
| 2012/0298361 A1 | 11/2012 | Sampson |
| 2013/0008639 A1 | 1/2013 | Tassaroli |
| 2013/0008669 A1 | 1/2013 | Deere et al. |
| 2013/0043074 A1 | 2/2013 | Tassaroli |
| 2013/0062055 A1 | 3/2013 | Tolman et al. |
| 2013/0098257 A1 | 4/2013 | Goodridge et al. |
| 2013/0118342 A1 * | 5/2013 | Tassaroli ............... E21B 43/116 89/1.15 |
| 2013/0125772 A1 | 5/2013 | Backhus et al. |
| 2013/0199843 A1 | 8/2013 | Ross |
| 2013/0220613 A1 * | 8/2013 | Brooks .................... F42D 1/04 175/3.5 |
| 2013/0248174 A1 | 9/2013 | Dale et al. |
| 2013/0256464 A1 | 10/2013 | Belik et al. |
| 2014/0033939 A1 | 2/2014 | Priess et al. |
| 2014/0053750 A1 | 2/2014 | Lownds et al. |
| 2014/0131035 A1 | 5/2014 | Entchev et al. |
| 2015/0136422 A1 | 5/2015 | Rodgers |
| 2015/0176386 A1 | 6/2015 | Castillo et al. |
| 2015/0226044 A1 | 8/2015 | Ursi et al. |
| 2015/0330192 A1 | 11/2015 | Man et al. |
| 2016/0040520 A1 | 2/2016 | Tolman et al. |
| 2016/0050724 A1 | 2/2016 | Moon et al. |
| 2016/0061572 A1 | 3/2016 | Eitschberger et al. |
| 2016/0084048 A1 * | 3/2016 | Harrigan ............... E21B 43/117 175/4.57 |
| 2016/0168961 A1 | 6/2016 | Parks et al. |
| 2016/0333675 A1 | 11/2016 | Wells et al. |
| 2016/0365667 A1 | 12/2016 | Mueller et al. |
| 2017/0030693 A1 | 2/2017 | Preiss et al. |
| 2017/0032653 A1 | 2/2017 | Crawford et al. |
| 2017/0268320 A1 | 9/2017 | Angman et al. |
| 2017/0276465 A1 | 9/2017 | Parks et al. |
| 2017/0298716 A1 | 10/2017 | McConnell et al. |
| 2018/0135398 A1 | 5/2018 | Entchev et al. |
| 2018/0202789 A1 | 7/2018 | Parks et al. |
| 2018/0209251 A1 | 7/2018 | Robey et al. |
| 2018/0274311 A1 | 9/2018 | Zsolt |
| 2019/0049225 A1 | 2/2019 | Eitschberger |
| 2019/0301261 A1 | 10/2019 | Anthony et al. |
| 2020/0199983 A1 | 6/2020 | Preiss et al. |
| 2020/0332630 A1 | 10/2020 | Davis et al. |

FOREIGN PATENT DOCUMENTS

| | | |
|---|---|---|
| CA | 2824838 A1 | 2/2015 |
| CA | 2888787 A1 | 10/2015 |
| CA | 2821506 C | 3/2020 |
| CN | 85107897 A | 9/1986 |
| CN | 2661919 | 12/2004 |
| CN | 2821154 | 9/2006 |
| CN | 101397890 A | 4/2009 |
| CN | 101454635 A | 6/2009 |
| CN | 101691837 B | 4/2010 |
| CN | 201620848 U | 11/2010 |
| CN | 201764910 U | 3/2011 |
| CN | 102878877 A | 1/2013 |
| CN | 103993861 A | 8/2014 |

(56) References Cited

FOREIGN PATENT DOCUMENTS

| | | |
|---|---|---|
| CN | 205577894 U | 9/2016 |
| CN | 105822223 B | 3/2017 |
| DE | 102005031673 A1 | 3/2006 |
| DE | 102007007498 | 10/2015 |
| EP | 0088516 A1 | 9/1983 |
| EP | 0207749 A2 | 1/1987 |
| EP | 0416915 A2 | 3/1991 |
| EP | 0180520 B1 | 5/1991 |
| EP | 679859 A2 | 11/1995 |
| EP | 694157 B1 | 8/2001 |
| EP | 2702349 B1 | 11/2015 |
| EP | 2310616 B1 | 10/2017 |
| GB | 2404291 A | 1/2005 |
| JP | 2003329399 A | 11/2003 |
| RU | 7852 U1 | 10/1998 |
| RU | 2295694 C2 | 3/2007 |
| RU | 93521 U1 | 4/2010 |
| RU | 100552 U1 | 12/2010 |
| RU | 2434122 C2 | 11/2011 |
| RU | 2633904 C1 | 10/2017 |
| WO | 9721067 A1 | 6/1997 |
| WO | 9745696 A1 | 12/1997 |
| WO | 1998046965 A1 | 10/1998 |
| WO | 9905390 A1 | 2/1999 |
| WO | 0123827 A1 | 4/2001 |
| WO | 0133029 A2 | 5/2001 |
| WO | 2001059401 A1 | 8/2001 |
| WO | 2002099356 A2 | 12/2002 |
| WO | 2009091422 A2 | 7/2009 |
| WO | 2009091422 A3 | 3/2010 |
| WO | 2010104634 A2 | 9/2010 |
| WO | 2011160099 A1 | 12/2011 |
| WO | 2012006357 A2 | 1/2012 |
| WO | 2012135101 A2 | 10/2012 |
| WO | 2012106640 A3 | 11/2012 |
| WO | 2012149584 A1 | 11/2012 |
| WO | 2014046670 A1 | 3/2014 |
| WO | 2015006869 A1 | 1/2015 |
| WO | 2015134719 A1 | 9/2015 |
| WO | 2016100269 A1 | 6/2016 |
| WO | 2019147294 A1 | 8/2019 |
| WO | 2020112983 A1 | 6/2020 |
| WO | 2020200935 A1 | 10/2020 |
| WO | 2021025716 A1 | 2/2021 |
| WO | 2021116336 A1 | 6/2021 |
| WO | 2021116338 A1 | 6/2021 |
| WO | 2021122797 A1 | 6/2021 |

OTHER PUBLICATIONS

DynaEnergetics, Selective Perforating Switch, Product Information Sheet, May 27, 2011, 1 pg.
EP Patent Office—International Searching Authority, PCT Search Report and Written Opinion for PCT Application No. PCT/EP2014/065752, dated May 4, 2015, 12 pgs.
SIPO, Search Report dated Mar. 29, 2017, in Chinese: See Search Report for CN App. No. 201480040456.9, which is in the same family as PCT App. No. PCT/CA2014/050673, 12 and 3 pgs.
Jim Gilliat/Kaled Gasmi, New Select-Fire System, Baker Hughes, Presentation—2013 Asia-Pacific Perforating Symposium, Apr. 29, 2013, 16 pgs., http://www.perforators.org/presentations.php.
DynaEnergetics, DYNAselect Electronic Detonator 0015 SFDE RDX 1.4S, Product Information, Dec. 16, 2011, 1 pg.
DynaEnergetics, DYNAselect Electronic Detonator 0015 SFDE RDX 1.4B, Product Information, Dec. 16, 2011, 1 pg.
Austin Powder Company, A-140 F & Block, Detonator & Block Assembly, 2 pages.
Owen Oil Tools & Pacific Scientific, Side Block for Side Initiation, 1 page.
SIPO, Office Action dated Jun. 27, 2018: See Office Action for CN App. No. 201580011132.7, which is in the same family as PCT App. No. PCT/US2015/18906, 9 pages and 5 pages.
Amit Govil, Selective Perforation: A Game Changer in Perforating Technology—Case Study, presented at the 2012 European and West African Perforating Symposium, Schlumberger, Nov. 7-9, 2012, 14 pages.
DynaEnergetics, DYNAselect System, information downloaded from website, Jul. 3, 2013, 2 pages, http://www.dynaenergetics.com/.
GB Intellectual Property Office, Search Report for GB App. No. 1700625.5 (now GB Patent GB2548203), which is in the same family as U.S. Pat. No. 9,494,021, dated Jul. 7, 2017, 5 pages.
USPTO—International Searching Authority, International Search Report and Written Opinion of International Application No. PCT/US2015/018906, dated Jul. 10, 2015, 12 pages.
DynaEnergetics, Gun Assembly, Product Summary Sheet, May 7, 2004, 1 page.
GB Intellectual Property Office, Office Action for GB App. No. GB1717516.7, which is the same family as PCT App. No. PCT/CA2014/050673, dated Feb. 27, 2018, 6 pages.
DynaEnergetics, Selective Perforating Switch, information downloaded from website, Jul. 3, 2013, 2 pages, http://www.dynaenergetics.com/.
Hunting, Wireline Top Fire Detonator Systems, Product Information Sheet, 1 page.
Hunting Titan Inc., Petition for Inter Parties Review of U.S. Pat. No. 9581422, filed Feb. 16, 2018, 93 pages.
DynaEnergetics GMBH & Co. KG, Patent Owner's Response to Hunting Titan's Petition for Inter Parties Review—Case IPR2018-00600, filed Dec. 6, 2018, 73 pages.
DynaEnergetics GMBH & Co. KG, Patent Owner's Motion to Amend—Case IPR2018-00600, filed Dec. 6, 2018, 53 pages.
U.S. Patent Trial and Appeal Board, Institution of Inter Partes Review of U.S. Pat. No. 9,581,422, Case IPR2018-00600, Aug. 21, 2018, 9 pages.
International Search Report and Written Opinion of International Application No. PCT/CA2014/050673, dated Oct. 9, 2014, 7 pages.
Intellectual Property India, Office Action of IN Application No. 201647004496, dated Jun. 7, 2019, which is in the same family as U.S. Appl. No. 16/540,484, 6 pages.
UK Examination Report of United Kingdom Patent Application No. GB1600085.3, which is in the same family as U.S. Pat. No. 9,494,021, dated Mar. 9, 2016, 1 pg.
FIIP, Search Report for RU App. No. 2016104882/03, which is in the same family as PCT App. No. PCT/CA2014/050673, dated Feb. 1, 2018, 11 pages.
Norwegian Industrial Property Office, Search Report for NO Patent App. No. 20160017, which is in the same family as PCT App. No PCT/CA2014/050673, dated Jun. 15, 2017, 2 pages.
Norwegian Industrial Property Office, Office Action for NO Patent App. No. 20160017, which is in the same family as PCT App. No. PCT/CA2014/050673, dated Jun. 15, 2017, 3 pages.
Jet Research Center Inc., Red RF Safe Detonators Brochure, 2008, 2 pages, www.jetresearch.com.
Jet Research Center Inc., JRC Catalog, 36 pages, www.jetresearch.com.
Horizontal Wireline Services, Presentation of a completion method of shale demonstrated through an example of Marcellus Shale, Pennsylvania, USA, Presented at 2012 International Perforating Symposium (Apr. 26-28, 2012), 17 pages.
Schlumberger & Said Abubakr, Combining and Customizing Technologies for Perforating Horizontal Wells in Algeria, Presented at 2011 MENAPS, Nov. 28-30, 2011, 20 pages.
Baker Hughes, Long Gun Deployment Systems IPS-12-28, Presented at 2012 International Perforating Symposium, Apr. 26 and 27, 2011, 11 pages.
Owen Oil Tools, Recommended Practice for Oilfield Explosive Safety, Presented at 2011 MENAPS Middle East and North Africa Perforating Symposium, Nov. 28-30, 2011, 6 pages.
United States Patent and Trademark Office, Non-Final Office Action of U.S. Appl. No. 16/540,484, which is in the same family as U.S. Appl. No. 16/540,484, dated Dec. 27, 2019, 5 pgs.
United States Patent and Trademark Office, Non-Final Office Action of U.S. Appl. No. 16/540,484, which is in the same family as U.S. Appl. No. 16/540,484, which cited U.S. Pat. No. 4,266,613A, dated Nov. 12, 2019, 9 pgs.

(56) References Cited

OTHER PUBLICATIONS

Brazilian Patent and Trademark Office; Search Report for BR Application No. BR112015033010-0; dated May 5, 2020; 4 pages.
Burndy, Bulkhead Ground Connector, Mechanical Summary Sheet, The Grounding Superstore, Jul. 15, 2014, 1 page, https://www.burndy.com/docs/default-source/cutsheets/bulkhead-connect.
Canadian Intellectual Property Office; Office Action for CA App. No. 2923860 dated Jul. 14, 2017; 3 pages.
Canadian Intellectual Property Office Office Action for CA App. No. 2923860 dated Nov. 25, 2016; 3 pages.
Canadian Intellectual Property Office, Notice of Allowance for CA Appl. No. 2,821,506; dated Jul. 31, 2019; 1 page.
Canadian Intellectual Property Office; Office Action for CA Appl. No. 2,821,506; dated Mar. 21, 2019; 4 pages.
Dalia Abdallah et al., Casing Corrosion Measurement to Extend Asset Life, Dec. 31, 2013, 14 pgs., https://www.slb.com/-/media/files/oilfield-review/2-casing-corr-2-english.
Djresource, Replacing Signal and Ground Wire, May 1, 2007, 2 pages, http://www.djresource.eu/Topics/story/110/Technics-SL-Replacing-Signal-and-Ground-Wire/.
DynaEnergetics GmbH & Co. KG; Patent Owner's Precedential Opinion Panel Request for Case IPR2018-00600; Sep. 18, 2019, 2 pg.
DynaEnergetics, Electronic Top Fire Detonator, Product Information Sheet, Jul. 30, 2013 1 pg.
DynaEnergetics; DynaStage Solution—Factory Assembled Performance-Assured Perforating Systems; 6 pages.
Eric H. Findlay, Jury Trial Demand in Civil Action No. 6:20-cv-00069-ADA, dated Apr. 22, 2020, 32 pages.
European Patent Office; International Search Report and Written Opinion for PCT Application No. PCT/EP2014/065752 dated May 4, 2015; 12 pgs.
European Patent Office; Invitation to Correct Deficiencies noted in the Written Opinion for European App. No. 15721178.0; dated Dec. 13, 2016; 2 pages.
European Patent Office; Office Action for EP App. No. 15721178.0; dated Sep. 6, 2018; 5 pages.
Federal Institute of Industrial Property; Decision of Granting for RU Appl. No. 2016104882/03(007851); dated May 17, 2018; 15 pages (English translation 4 pages).
Federal Institute of Industrial Property; Decision on Granting a Patent for Invention Russian App. No. 2016139136/03(062394); dated Nov. 8, 2018; 20 pages (Eng Translation 4 pages); Concise Statement of Relevance: Search Report at 17-18 of Russian-language document lists several 'A' references based on RU application claims.
Federal Institute of Industrial Property; Inquiry for RU App. No. 2016104882/03(007851); dated Feb. 1, 2018; 7 pages, English Translation 4 pages.
Federal Institute of Industrial Property; Inquiry for RU Application No. 2016110014/03(015803); dated Feb. 1, 2018; 6 pages (Eng. Translation 4 pages).
GB Intellectual Property Office; Examination Report for GB Appl. No. 1717516.7; dated Apr. 13, 2018; 3 pages.
GB Intellectual Property Office; Notification of Grant for GB Appl. No. 1717516.7; dated Oct. 9, 2018; 2 pages.
GB Intellectual Property Office; Search Report for GB. Appl. No. 1700625.5; dated Dec. 21, 2017; 5 pages.
Industrial Property Office, Czech Republic; Office Action for CZ App. No. PV 2017-675; dated Jul. 18, 2018; 2 pages; Concise Statement of Relevance: Examiner's objection of CZ application claims 1, 7, and 16 based on US Pub No. 20050194146 alone or in combination with WO Pub No. 2001059401.
Industrial Property Office, Czech Republic; Office Action for CZ App. No. PV 2017-675; dated Oct. 26, 2018; 2 pages.
Industrial Property Office, Czech Republic; Office Action; CZ App. No. PV 2017-675; dated Dec. 17, 2018; 2 pages.
International Searching Authority, International Preliminary Report on Patentability for PCT App. No. PCT/EP2014/065752; dated Mar. 1, 2016, 10 pgs.
International Searching Authority; International Preliminary Report on Patentability for PCT Appl. No. PCT/CA2014/050673; dated Jan. 19, 2016; 5 pages.
International Searching Authority; International Search Report and Written Opinion for PCT App. No. PCT/EP2015/059381; dated Nov. 23, 2015; 14 pages.
International Searching Authority; PCT Search Report and Written Opinion for PCT App No. PCT/EP2014/065752; dated May 4, 2015; 12 pgs.
Jet Research Centers, Capsule Gun Perforating Systems, Alvarado, Texas, 26 pgs., https://www.jetresearch.com/content/dam/jrc/Documents/Books_Catalogs/07_Cap_Gun.pdf.
McNelis et al.; High-Performance Plug-and-Perf Completions in Unconventional Wells; Society of Petroleum Engineers Annual Technical Conference and Exhibition; Sep. 28, 2015.
Norwegian Industrial Property Office; Office Action and Search Report for NO App. No. 20171759; dated Jan. 14, 2020; 6 pages.
Norwegian Industrial Property Office; Office Action for NO Appl. No. 20160017; dated Dec. 4, 2017; 2 pages.
Norwegian Industrial Property Office; Opinion for NO Appl. No. 20171759; dated Apr. 5, 2019; 1 page.
Owen Oil Tools, E & B Select Fire Side Port, Tandem Sub, Apr. 2010, 2 pgs., https://www.corelab.com/owen/cms/docs/Canada/10A_eandbsystem-01.0-c.pdf.
Owen Oil Tools, Expendable Perforating Guns, Jul. 2008, 7 pgs., https://www.corelab.com/owen/cms/docs/Canada/10A_erhsc-01.0-c.pdf.
Owens Oil Tools, E & B Select Fire Side Port Tandem Sub Assembly, 2009, 9 pgs., https://www.corelab.com/owen/CMS/docs/Manuals/gunsys/MAN-30-XXX-0002-96-R00.pdf.
Robert Parrott, Case IPR2018-00600 for U.S. Pat. No. 9,581,422 B2, Declaration regarding Patent Invalidity, dated Jun. 29, 2020, 146 pages.
State Intellectual Property Office People's Republic of China; First Office Action for Chinese App. No. 201811156092.7; dated Jun. 16, 2020; 6 pages (Eng Translation 8 pages).
State Intellectual Property Office, P.R. China; First Office Action for CN App. No. 201480047092.7; dated Apr. 24, 2017.
State Intellectual Property Office, P.R. China; First Office Action with full translation for CN App. No. 201480040456.9; dated Mar. 29, 2017; 12 pages (English translation 17 pages).
State Intellectual Property Office, P.R. China; Notification to Grant Patent Right for Chinese App. No. 201580011132.7; dated Apr. 3, 2019; 2 pages (Eng. Translation 2 pages).
State Intellectual Property Office, P.R. China; Notification to Grant Patent Right for CN App. No. 201480040456.9; dated Jun. 12, 2018; 2 pages (English translation 2 pages).
State Intellectual Property Office, P.R. China; Second Office Action for CN App. No. 201480040456.9; dated Nov. 29, 2017; 5 pages (English translation 1 page).
State Intellectual Property Office, P.R. China; Second Office Action for CN App. No. 201480047092.7; dated Jan. 4, 2018; 3 pages.
United States Patent and Trademark Office, Case IPR2018-00600 for U.S. Pat. No. 9,581,422 B2, Reply in Support of Patent Owner's Motion to Amend, dated Mar. 21, 2019, 15 pgs.
United States Patent and Trademark Office, Case IPR2018-00600 for U.S. Pat. No. 9,581,422 B2, DynaEnergetics GmbH & Co. KG's Patent Owner Preliminary Response, dated May 22, 2018, 47 pgs.
United States Patent and Trademark Office, Case IPR2018-00600 for U.S. Pat. No. 9,581,422 B2, Order Granting Precedential Opinion Panel, Paper No. 46, dated Nov. 7, 2019, 4 pgs.
United States Patent and Trademark Office, Case IPR2018-00600 for U.S. Pat. No. 9,581,422 B2, Patent Owner's Decision, Granting Patent Owner's Request for Hearing and Granting Patent Owner's Motion to Amend, dated Jul. 6, 2020, 27 pgs.
United States Patent and Trademark Office, Case IPR2018-00600 for U.S. Pat. No. 9,581,422 B2, Patent Owner's Opening Submission to Precedential Opinion Panel, dated Dec. 20, 2019, 21 pgs.
United States Patent and Trademark Office, Case IPR2018-00600 for U.S. Pat. No. 9,581,422 B2, Patent Owner's Request for Hearing, dated Sep. 18, 2019, 19 pgs.

(56) References Cited

OTHER PUBLICATIONS

United States Patent and Trademark Office, Case IPR2018-00600 for U.S. Pat. No. 9,581,422 B2, Patent Owner's Responsive Submission to Precedential Opinion Panel, dated Jan. 6, 2020, 16 pgs.
United States Patent and Trademark Office, Case IPR2018-00600 for U.S. Pat. No. 9,581,422 B2, Patent Owner's Sur-reply, dated Mar. 21, 2019, 28 pgs.
United States Patent and Trademark Office, Case IPR2018-00600 for U.S. Pat. No. 9,581,422 B2, Petitioner's Additional Briefing to the Precedential Opinion Panel, dated Dec. 20, 2019, 23 pgs.
United States Patent and Trademark Office, Case IPR2018-00600 for U.S. Pat. No. 9,581,422 B2, Petitioner's Opposition to Patent Owner's Motion to Amend, dated Mar. 7, 2019, 30 pgs.
United States Patent and Trademark Office, Case IPR2018-00600 for U.S. Pat. No. 9,581,422 B2, Petitioner's Reply Briefing to the Precedential Opinion Panel, dated Jan. 6, 2020, 17 pgs.
United States Patent and Trademark Office, Case IPR2018-00600 for U.S. Pat. No. 9,581,422 B2, Petitioner's Reply in Inter Partes Review of U. S. Pat. No. 9,581,422, dated Mar. 7, 2019, 44 pgs.
United States Patent and Trademark Office, Case PGR 2020-00072 for U.S. Pat. No. 10,429,161 B2, Petition for Post Grant Review of Claims 1-20 of U.S. Pat. No. 10,429,161 Under 35 U.S.C. §§ 321-28 and 37 C.F.R. §§42.200 ET SEQ., dated Jun. 30, 2020, 109 pages.
United States Patent and Trademark Office, Final Written Decision of Case IPR2018-00600 for U.S. Pat. No. 9,581,422 B2, Paper No. 42, dated Aug. 20, 2019, 31 pgs.
United States Patent and Trademark Office, Non-final Office Action of U.S. Appl. No. 16/451,440, dated Oct. 24, 2019, 22 pgs.
United States Patent and Trademark Office, Non-final Office Action of U.S. Appl. No. 16/455,816, dated Nov. 5, 2019, 17 pgs.
United States Patent and Trademark Office, Office Action of U.S. Appl. No. 14/767,058, dated Jul. 15, 2016, 9 pgs.
United States Patent and Trademark Office, Office Action of U.S. Appl. No. 15/117,228, dated May 31, 2018, 9 pgs.
United States Patent and Trademark Office, Office Action of U.S. Appl. No. 15/617,344, dated Jan. 23, 2019, 5 pgs.
United States Patent and Trademark Office, Office Action of U.S. Appl. No. 15/788,367, dated Oct. 22, 2018, 6 pgs.
United States Patent and Trademark Office, Office Action of U.S. Appl. No. 15/920,800, dated Dec. 27, 2019, 6 pgs.
United States Patent and Trademark Office, Office Action of U.S. Appl. No. 15/920,812, dated Dec. 27, 2019, 6 pgs.
United States Patent and Trademark Office, Office Action of U.S. Appl. No. 15/920,812, dated May 27, 2020, 5 pgs.
United States Patent and Trademark Office, Office Action of U.S. Appl. No. 16/026,431, dated Jul. 30, 2019, 10 pgs.
United States Patent and Trademark Office, Office Action of U.S. Appl. No. 16/359,540, dated Aug. 14, 2019, 9 pgs.
United States Patent and Trademark Office, Office Action of U.S. Appl. No. 16/359,540, dated May 3, 2019, 11 pgs.
United States Patent and Trademark Office, Office Action of U.S. Appl. No. 16/585,790, dated Nov. 12, 2019, 9 pgs.
United States Patent and Trademark Office, Office Action of U.S. Appl. No. 16/809,729, dated Jun. 19, 2020, 9 pgs.
United States Patent and Trademark Office, Office Action of U.S. Appl. No. 29/733,080, dated Jun. 26, 2020, 8 pgs.
United States Patent and Trademark Office; Notice of Allowance for U.S. Appl. No. 16/387,696; dated Jan. 29, 2020; 7 pages.
USPTO; Notice of Allowance for U.S. Appl. No. 14/904,788; dated Jul. 6, 2016; 8 pages.
USPTO; Supplemental Notice of Allowability for U.S. Appl. No. 14/904,788; dated Jul. 21, 2016; 2 pages.
United States Patent and Trademark Office, Non-final Office Action of U.S. Appl. No. 16/542,890, dated Nov. 4, 2019, 16 pgs.
IPR2018-00600, Exhibit 3001, Patent Owner's Precedential Opinion Panel Request Letter in regard to Case IPR2018-00600 for U.S. Pat. No. 9,581,422 B2, dated Sep. 18, 2019, 2 pg.
United States Patent and Trademark Office, Case IPR2018-00600 for U.S. Pat. No. 9,581,422 B2, Patent Owner's Motion to Amend, dated Dec. 6, 2018, 53 pgs.
Baker Hughes, SurePerf Rapid Select-Fire System, Perforate production zones in a single run, Sep. 2012, 2 pgs., www.bakerhughes.com.
Intellectual Property India, Office Action of IN Application No. 201647004496, dated Jun. 7, 2019, which is in the same family as PCT App No. PCT/CA2014/050673, 6 pgs.
Norwegan Industrial Property Office, Search Report for NO Patent App. No. 20160017, which is in the same family as PCT App No. PCT/CA2014/050673, dated Jun. 15, 2017, 2 pgs.
Norwegian Industrial Property Office, Office Action for NO Patent App. No. 20171759, dated Jan. 14, 2020, 4 pgs.
Norwegian Industrial Property Office, Search Report for NO App. No. 20/171,759, dated Jan. 14, 2020, 2 pgs.
International Search Report and Written Opinion of International App. No. PCT/EP2019/072064, dated Nov. 20, 2019, 15 pgs.
Corelab, RF-Safe Green Detonator, Data Sheet, Jul. 26, 2017, 2 pages.
DynaEnergetics Europe; Complaint and Demand for Jury Trial, Civil Action No. 6:20-cv-00069; dated Jan. 30, 2020; 9 pages.
DynaEnergetics Europe; Complaint and Demand for Jury Trial,Civil Action No. 4:17-cv-03784; dated Dec. 14, 2017; 7 pages.
DynaEnergetics Europe; Exhibit B Invalidity Claim Chart for Civil Action No. 4:19-cv-01611; dated May 2, 2019; 52 pages.
DynaEnergetics Europe; Exhibit C Invalidity Claim Chart for Civil Action No. 4:17-cv-03784; dated Jul. 13, 2020; 114 pages.
DynaEnergetics Europe; Plaintiffs' Local Patent Rule 3-1 Infringement Contentions for Civil Action No. 4:19-cv-01611; dated May 25, 2018; 10 Pages.
DynaEnergetics Europe; Plaintiffs' Motion to Dismiss Defendants' Counterclaim and to strike Affirmative Defenses, Civil Action No. 4:17-cv-03784; dated Feb. 20, 2018; 9 pages.
DynaEnergetics Europe; Plaintiffs' Preliminary Claim Constructions and Identification of Extrinsic Evidence Civil Action No. 4:17-cv-03784; dated Aug. 3, 2018; 9 pages.
DynaEnergetics Europe; Plaintiffs' Preliminary Infringement Contentions, Civil Action No. 6:20-cv-00069-ADA; dated Apr. 22, 2020; 32 pages.
DynaEnergetics Europe; Plaintiffs' Reply in Support of Motion to Dismiss and Strike for Civil Action No. 6:20-cv-00069-ADA; dated Apr. 29, 2020; 15 pages.
DynaEnergetics Europe; Plaintiffs Response to Defendant Hunting Titan Ins' Inoperative First Amended Answer, Affirmative Defenses, and Counterclaims for Civil Action No. 6:20-cv-00069-ADA; dated May 13, 2020.
DynaEnergetics Europe; Plaintiffs' Response to Defendants' Answer to Second Amended Complaint Civil Action No. 6:20-cv-00069-ADA; dated May 26, 2020; 18 pages.
DynaEnergetics, Selection Perforating Switch, Product Information Sheet, May 27, 2011, 1 pg.
Farinago, et al.; Long Gun Deployment Systems IPS-12-28; presented at International Perforating Symposium, Apr. 26-28, 2012; 11 pages.
GB Intellectual Property Office, Combined Search and Examination Report for GB App. No. 1717516.7, dated Feb. 27, 2018, 6 pgs.
GB Intellectual Property Office, Combined Search and Examination Report for GB App. No. GB1700625.5, dated Jul. 7, 2017, 5 pages.
German Patent Office, Office Action dated May 22, 2014, in German: See Office Action for German Patent Application No. 10 2013 109 227.6, which is in the same family as PCT Application No. PCT/EP2014/065752, 8 pgs.
Hunting Titan Ltd,; Defendants' Answer and Counterclaims, Civil Action No. 4:19-cv-01611, consolidated to Civil Action No. 4:17-cv-03784; dated May 28, 2019; 21 pages.
Hunting Titan Ltd.; Petition for Inter Partes Review of U.S. Pat. No. 9,581,422 Case No. IPR2018-00600; dated Feb. 16, 2018; 93 pages.
Hunting Titan Ltd.; Defendants' Answer and Counterclaims, Civil Action No. 6:20-cv-00069; dated Mar. 17, 2020; 30 pages.
Hunting Titan Ltd.; Defendants' Answer to First Amended Complaint and Counterclaims, Civil Action No. 6:20-cv-00069; dated Apr. 6, 2020; 30 pages.
Hunting Titan Ltd.; Defendants' Answer to Second Amended Complaint and Counterclaims, Civil Action No. 6:20-cv-00069; dated May 12, 2020; 81 pages.

(56) References Cited

OTHER PUBLICATIONS

Hunting Titan Ltd.; Defendants Invalidity Contentions Pursuant to Patent Rule 3-3, Civil Action No. 4:17-cv-03784; dated Jul. 6, 2018; 29 pages.
Hunting Titan Ltd.; Defendants' Objections and Responses to Plaintiffs' First Set of Interrogatories, Civil Action No. 4:17-cv-03784; dated Jun. 11, 2018.
Hunting Titan Ltd.; Defendants' Opposition to Plaintiffs' Motion to Dismiss and Strike Defendants' Amended Counterclaim and Affirmative Defenses for Unenforceability due to Inequitable Conduct for Civil Action No. 4:17-cv-03784; dated Apr. 24, 2018; 8 pages.
merriam-webster.com, Insulator Definition, https://www.merriam-webster.com/dictionary/insulator, Jan. 31, 2018, 4 pages.
Parrot, Robert; Declaration, PGR 2020-00080; dated Aug. 11, 2020; 400 pages.
Schlumberger; Selective Perforation: A Game Changer in Perforating Technology—Case Study; issued 2012; 14 pages.
Smylie, Tom, New Safe and Secure Detonators for the Industry's consideration, presented at Explosives Safety & Security Conference, Marathon Oil Co, Houston; Feb. 23-24, 2005, 20 pages.
U.S. Appl. No. 61/733,129; filed Dec. 4, 2012; 10 pages.
U.S. Appl. No. 61/819,196; filed May 3, 2013 ; 10 pages.
United States Patent and Trademark Office; Notice of Allowability for U.S. Appl. No. 14/908,788; dated Dec. 27, 2017; 5 pages.
United States Patent and Trademark Office; Notice of Allowance for U.S. Appl. No. 15/920,812, dated Aug. 18, 2020; 5 pages.
United States Patent and Trademark Office; Notice of Allowance for U.S. Appl. No. 16/585,790, dated Aug. 5, 2020; 15 pages.
United States Patent and Trademark Office; Notice of Allowance for U.S. Appl. No. 16/423,789; dated Jul. 23, 2020 7 pages.
United States Patent and Trial Appeal Board; Final Written Decision on IPR2018-00600; dated Aug. 20, 2019; 31 pages.
USPTO, U.S. Pat. No. 438305A, issued on Oct. 14, 1890 to T.A. Edison, 2 pages.
WIPO, International Search Report for International Application No. PCT/CA2014/050673, dated Oct. 9, 2014, 3 pgs.
WIPO, Written Opinion of International Searching Authority for PCT Application No. PCT/CA2014/050673, dated Oct. 9, 2014, 4 pgs.
Baumann et al.; Perforating Innovations—Shooting Holes in Performance Models; Oilfield Review, Autumn 2014, vol. 26, Issue No. 3 pp. 14-31; 18 pages.
C T Corporation Systems; Proof of Service of the Complaint, Civil Action No. 4:20-cv-01539; dated May 1, 2020; 39 pages.
DynaEnergetics Europe GMBH; Principal and Response Brief of Cross-Appellant for United States Court of Appeals case No. 2020-2163, -2191; dated Jan. 11, 2021; 95 pages.
DynaEnergetics Europe; Complaint and Demand for Jury Trial, Civil Action No. 6:20-cv-01201; dated Dec. 30, 2020; 12 pages.
DynaEnergetics Europe; Plaintiffs' Pending Motion for Reconsideration for Civil Action No. 4:17-cv-03784; dated Jan. 21, 2021; 4 pages.
G&H Diversified Manufacturing, LP; Complaint for Declaratory Judgement for Civil Action No. 3:20-cv-00376; dated Dec. 14, 2020; 7 pages.
International Searching Authority; International Search Report and Written Opinion for PCT Application No. EP2020066327; dated Jan. 11, 2021; 17 pages.
International Searching Authority; Invitation to Pay Additional Fees with Partial International Search for Application No. PCT/EP2020/075788; dated Jan. 19, 2021; 9 pages.
McBride Michael; Declaration for IPR2021-00082; dated Oct. 20, 2020; 3 pages.
Nextier Oilfield Solutions Inc; Petition for Inter Partes Review No. IPR2021-00082; dated Oct. 21, 2020; 111 pages.
Exus Perforating LLC; Complaint and Demand for Jury Trial for Civil Case No. 4:20-cv-01539; dated Apr. 30, 2020; 11 pages.
Parrott, Robert; Declaration for IPR2021-00082; dated Oct. 20, 2020; 110 pages.
Smithson, Anthony; Declaration for IPR2021-00082; dated Oct. 16, 2020; 2 pages.
United States Patent Trial and Appeal Board; Decision Denying Institution of Post-Grant Review; PGR No. 2020-00072; dated Jan. 19, 2021; 38 pages.
Baker Hughes; SurePerf Rapid Select-Fire System Perforate production zones in a single run; 2012; 2 pages.
Canadian Intellectual Property Office; Office Action for CA Application No. 3040648; dated Nov. 18, 2020; 4 pages.
DynaEnergetics Europe GMBH; Patent Owner's Preliminary Response for PGR2020-00072; dated Oct. 23, 2020; 108 pages.
DynaEnergetics Europe GMBH; Patent Owner's Preliminary Response for PGR2020-00080; dated Nov. 18, 2020; 119 pages.
DynaEnergetics Europe; DynaEnergetics exhibition and product briefing; 2013; 15 pages.
DynaEnergetics Europe; DynaStage Gun System; May 2014; 2 pages.
Hunting Titan Inc.; Petition for Post Grant Review of U.S. Pat. No. 10,472,938; dated Aug. 12, 2020; 198 pages.
Hunting Titan, H-1 Perforating System, Sep. 1, 2017, 3 pgs., http://www.hunting-intl.com/titan/perforating-guns-and-setting-tools/h-1%C2%AE-perforating-system.
Hunting Titan, Inc., U.S. Appl. No. 61/733,129; titled Perforating Gun With Integrated Initiator; filed Dec. 4, 2012; 10 pages.
Hunting Titan, Inc., U.S. Appl. No. 61/819,196; titled Perforating Gun With Integrated Initiator; 9 pages.
Hunting Titan; ControlFire RF-Safe Assembly Gun Loading Manual; 33 pages.
Hunting Titan; ControlFire User Manual; 2014; 56 pages.
Patent Trial and Appeal Board; Decision Granting Patent Owner's Request for Rehearing and Motion to Amend for IPR2018-00600; dated Jul. 6, 2020; 27 pages.
Preiss Frank et al.; Lowering Total Cost of Operations Through Higher Perforating Efficiency while simultaneously enhancing safety; 26 pages.
Rodgers, John; Declaration for PGR2020-00072; dated Oct. 23, 2020; 116 pages.
Rodgers, John; Declaration for PGR2020-00080; dated Nov. 18, 2020; 142 pages.
Salt Warren et al.; New Perforating Gun System Increases Safety and Efficiency; dated Apr. 1, 2016; 11 pages.
Scharf Thilo; Declaration for PGR2020-00080; dated Nov. 16, 2020; 16 pages.
Scharf, Thilo; Declaration for PGR2020-00072; dated Oct. 22, 2020; 13 pages.
United States Patent and Trademark Office; Final Office Action of U.S. Appl. No. 16/809,729, dated Nov. 3, 2020; 19 pages.
United States Patent and Trademark Office; Office Action for U.S. Appl. No. 17/004,966; dated Dec. 8, 2020; 30 pages.
United States Patent and Trademark Office; Restriction Requirement for U.S. Appl. No. 17/007,574; dated Oct. 23, 2020; 6 pages.
DynaEnergetics Europe; Complaint and Demand for Jury Trial, Civil Action No. 1 20-cv-03665; dated Dec. 15, 2020; 8 pages.
DynaEnergetics Europe; Complaint and Demand for Jury Trial, Civil Action No. 6:20-cv-01110; dated Dec. 4, 2020; 15 pages.
United States Patent and Trademark Office; Non-Final Office Action of U.S. Appl. No. 15/920,800; dated Dec. 9, 2020; 6 pages.
Nexus Perforating; Double Nexus Connect (Thunder Gun System) Description; Retrieved from the internet Jan. 27, 2021; 6 pages.
United States Patent and Trademark Office; Non-Final Office Action for U.S. Appl. No. 17/007,574; dated Jan. 29, 2021; 11 pages.
United States Patent and Trademark Office; Notice of Allowance for U.S. Appl. No. 16/809,729; dated Jan. 26, 2021; 9 pages.
United States Patent and Trademark Office; Non-Final Office Action for U.S. Appl. No. 15/920,812; dated Feb. 3, 2021; 5 pages.
Bear Manufacturing; Defendant Bear Manufacturing, LLC's Answer, Affirmative Defenses and Counterclaim in response to Plaintiffs' Complaint for Civil Action No. 3:21-cv-00185-M; dated Mar. 22, 2021; 14 pages.
Buche & Associates, P.C.; Rule 501 Citation of Prior Art and Written "Claim Scope Statements" in U.S. Pat. No. 10,844,697; dated Mar. 3, 2021; 24 pages.

(56) References Cited

OTHER PUBLICATIONS

Canadian Intellectual Property Office; Office Action for CA Application No. 2,941,648; dated Mar. 15, 2021; 3 pages.
Canadian Intellectual Property Office; Office Action for CA Application No. 3,070,118; dated Mar. 16, 2021; 3 pages.
Corelab Owen Oil Tools; Expendable Perforating Guns Description; https://www.corelab.com/owen/cms/docs/Canada/10A_erhsc-01.0-c.pdf; 2008; 7 pages.
DynaEnergetics Europe GMBH; Complaint and Demand for Jury Trial for Civil Action No. 4:21-cv-00280; dated Jan. 28, 2021; 55 pages.
United States Patent and Trademark Office; Non-Final Office Action for U.S. Appl. No. 15/920,812; dated Feb. 3, 2021; 7 pages.
United States Patent and Trademark Office; Notice of Allowance for U.S. Appl. No. 16/860,269; dated Apr. 7, 2021; 9 pages.
United States Patent Trial and Appeal Board; Institution Decision for PGR 2020-00080; dated Feb. 12, 2021; 15 pages.
DoreLab Quick Change Assembly; Exhibit No. 1034 of PGR No. 2021-00078; dated Aug. 2002; 1 page.
DynaEnergetics Europe; Defendants' Preliminary Infringement Contentions for Civil Action No. 3:20-CV-00376; dated Mar. 25, 2021; 22 pages.
DynaEnergetics Europe; DynaEnergetics Europe GMBH and DynaEnergetics US, Inc.'s Answer to Complaint and Counterclaim Civil Action No. 3:20-cv-000376; dated Mar. 8, 2021; 23 pages.
DynaEnergetics Europe; Patent Owner's Preliminary Response for PGR No. 2020-00080; dated Nov. 18, 2020; 119 pages.
H-1 Perforating Gun System; Exhibit No. 1022 of PGR No. 2021-00089; dated May 1, 2020; 6 pages.
Halliburton Wireline & Perforating; Velocity Perforating System Plug and Play Guns for Pumpdown Operations dated Mar. 2021; 8 pages.
Hunting Titan Gun System Catalog; Exhibit No. 1035 of PGR No. 2021-00078; 59 pages.
Hunting Wireline Hardware Brochures; Exhibit No. 1025 of PGR No. 2021-00078; dated 2013; 27 pages.
Owen Oil Tools; Corelab ZERO180 Gun System Assembly and Arming Procedures; dated 2015-2020; 38 pages.
Parrott, Robert A.; Declaration in Support of PGR20201-00089; dated Jun. 1, 2021; 353 pages.
Parrott, Robert; Declaration for PGR No. 2021-00078; dated May 10, 2021; 182 pages.
Perforating Services Catalog 2008 part 2 of 2; Exhibit 1020 of PGR No. 2021-00089; dated 2008; 239 pages.
Schlumberger Technology Corporation; Petiton for Post Grant Review Case No. PGR2021-00089; dated Jun. 1, 2021; 155 pages.
Schlumberger; Fractal Flex Multistage stimulation perforating system; dated 2018; 1 page.
Select Fire System; Exhibit 1028 of PGR 2021-00078; dated 2012; 165 pages.
United States Patent and Trademark Office; Non-Final Office Action for U.S. Appl. No. 16/809,729; dated Jun. 22, 2021; 15 pages.
United States Patent and Trademark Office; Non-Final Office Action for U.S. Appl. No. 17/221,219; dated Jun. 17, 2021; 10 pages.
United States Patent and Trademark Office; Patent Prosecution History of U.S. Appl. No. 61/733,129; dated Jan. 3, 2013; 22 pages.
U.S. Appl. No. 62/002,559; dated May 23, 2014; 19 pages.
U.S. Appl. No. 62/002,565; dated Jun. 25, 2014; 25 pages.
U.S. Appl. No. 62/014,900; dated Jul. 7, 2014; 25 pages.
U.S. Appl. No. 62/015,014; dated Jul. 7, 2014; 21 pages.
U.S. Appl. No. 62/015,030; dated Jul. 14, 2014; 29 pages.
U.S. Appl. No. 62/112,935; dated Feb. 6, 2015; 33 pages.
U.S. Appl. No. 62/131,324; dated Mar. 24, 2015; 65 pages.
U.S. Appl. No. 62/621,999; dated Jan. 25, 2018; 42 pages.
U.S. Appl. No. 62/627,591; dated Feb. 7, 2018; 40 pages.
DynaEnergetics Europe; Complaint and Demand for Jury Trial for Civil Action No. 4:21-cv-00280; dated Jan. 28, 2021; 13 pages.
Johnson, Bryce; Citation of Prior Art and Written Statements in Patent Files for U.S. Pat. No. 10,844,697; dated Apr. 29, 2021; 2 pages.
Johnson, Bryce; Rule 501 citation of prior art and written "claim scope statements" in U.S. Pat. No. 10,844,697; dated Apr. 29, 2021; 18 pages.
Exus Perforating LLC; Answer to DynaEnergetics Europe GMBH and DynaEnergetics US Inc/'s Complaint and Counterclaims; dated Apr. 15, 2021; 10 pages.
Norwegian Industrial Property Office; Notice of Allowance for NO Application No. 20171759; dated Apr. 23, 2021; 2 pages.
Owen Oil Tools; CoreLab Safe Ignition System Owen Det Bodies; dated 2015; 12 pages.
Canadian Intellectual Property Office; Notice of Allowance for CA Application No. 2,941,648; dated Feb. 2, 2022; 1 page.
DynaEnergetics, DYNAselect Electronic Detonator 0015 TFSFDE RDX 1.4B, Product Information, Apr. 23, 2015, 1 pg.
International Searching Authority; International Preliminary Report on Patentability of the International Searching Authority for PCT/EP2020/075788; dated Mar. 31, 2022; 10 pages.
United States District Court for the Northern District of Texas Dallas Division Memorandum Opinion and Order in Civil Action No. 3:21-cv-00192-M; Mar. 23, 2022; 34 pages (order is redacted to protect confidential information; redacted order has not yet been filed by the Court).
United States District Court for the Northern District of Texas Dallas Division Memorandum Opinion and Order in Civil Action No. 3:21-cv-00188-M; Mar. 23, 2022; 35 pages (order is redacted to protect confidential information; redacted order has not yet been filed by the Court).
United States Patent and Trademark Office; Final Office Action for U.S. Appl. No. 17/352,728; dated Mar. 9, 2022; 9 pages.
United States Patent and Trademark Office; Non-Final Office Action for U.S. Appl. No. 16/809,729; dated Feb. 3, 2022; 6 pages.
United States Patent and Trademark Office; Office Action in Ex Parte Reexamination for U.S. Pat. No. 10,844,697; dated Jan. 26, 2022; 10 pages.
Albert, Larry et al.; New Perforating Switch Technology Advances Safety & Reliability for Horizontal Completions; Unconventional Resources Tech. Conference; Jul. 20-22, 2015; 7 pgs.
Bear Manufacturing, LLC; Defendant's Preliminary Invalidity Contentions; dated Aug. 4, 2021; 23 pages.
Bear Manufacturing, LLC; Exhibit A16 U.S. Pat. No. 6,506,083 to Bickford, et al vs. Asserted Claims of U.S. Pat. No. 10,844,697; dated Aug. 4, 2021; 17 pages.
Bear Manufacturing, LLC; Exhibit A18 U.S. Pat. No. 8,943,943 to Tassaroli vs. Asserted Claims of U.S. Pat. No. 10,844,697; dated Aug. 4, 2021; 7 pages.
Bear Manufacturing, LLC; Exhibit A19 U.S. Pat. No. 7,762,331 to Goodman vs. Asserted Claims of U.S. Pat. No. 10,844,697; dated Aug. 4, 2021; 28 pages.
Bear Manufacturing, LLC; Exhibit A1 U.S. Pat. No. 5,155,293 to Barton vs. Asserted Claims of U.S. Pat. No. 10,844,697; dated Aug. 4, 2021; 21 pages.
Bear Manufacturing, LLC; Exhibit A10 U.S. Pat. No. 8,869,887 to Deere, et al vs. Asserted Claims of U.S. Pat. No. 10,844,697; dated Aug. 4, 2021; 10 pages.
Bear Manufacturing, LLC; Exhibit A11 U.S. Pat. No. 4,457,383 to Boop vs. Asserted Claims of U.S. Pat. No. 10,844,697; dated Aug. 4, 2021; 22 pages.
Bear Manufacturing, LLC; Exhibit A12 U.S. Publication No. 2012/0247771 to Black, et al vs. Asserted Claims of U.S. Pat. No. 10,844,697; dated Aug. 4, 2021; 26 pages.
Bear Manufacturing, LLC; Exhibit A13 U.S. Publication No. 2016/0084048 to Harrigan, et al vs. Asserted Claims of U.S. Pat. No. 10,844,697; dated Aug. 4, 2021; 14 pages.
Bear Manufacturing, LLC; Exhibit A15 U.S. Pat. No. 3,173,992 to Boop vs. Asserted Claims of U.S. Pat. No. 10,844,697; dated Aug. 4, 2021; 17 pages.
Bear Manufacturing, LLC; Exhibit A17 U.S. Pat. No. 8,387,533 to Runkel vs. Asserted Claims of U.S. Pat. No. 10,844,697; dated Aug. 4, 2021; 16 pages.
Bear Manufacturing, LLC; Exhibit A2 U.S. Pat. No. 6,582,251 to Burke, et al vs. Asserted Claims of U.S. Pat. No. 10,844,697; dated Aug. 4, 2021; 15 pages.

(56) References Cited

OTHER PUBLICATIONS

Bear Manufacturing, LLC; Exhibit A20 U.S. Publication 2012/0199352 to Lanclos vs. Asserted Claims of U.S. Pat. No. 10,844,697; dated Aug. 4, 2021; 24 pages.
Bear Manufacturing, LLC; Exhibit A21 "3.12-in Frac Gun" Publication and 3.12-in Frac Gun System by Sclumberger vs. Asserted Claims of U.S. Pat. No. 10,844,697; dated Aug. 4, 2021; 26 pages.
Bear Manufacturing, LLC; Exhibit A22 "New Select-Fire System" Publication and Select-Fire System by BakerHughes vs. Asserted Claims of U.S. Pat. No. 10,844,697; dated Aug. 4, 2021; 14 pages.
Bear Manufacturing, LLC; Exhibit A23 Amit Govil, "Selective Perforation: A Game Changer in Perforating Technology—Case Study," 2012 European and West African Perforating Symposium ("EWAPS") vs. Asserted Claims of U.S. Pat. No. 10,844,697; dated Aug. 4, 2021; 17 pages.
Bear Manufacturing, LLC; Exhibit A24 Schlumberger SafeJet System vs. Asserted Claims of U.S. Pat. No. 10,844,697; dated Aug. 4, 2021; 26 pages.
Bear Manufacturing, LLC; Exhibit A3 U.S. Pat. No. 7,901,247 to Ring vs. Asserted Claims of U.S. Pat. No. 10,844,697; dated Aug. 4, 2021; 19 pages.
Bear Manufacturing, LLC; Exhibit A4 U.S. Pat. No. 9,145,764 to Burton, et al vs. Asserted Claims of U.S. Pat. No. 10,844,697; dated Aug. 4, 2021; 18 pages.
Bear Manufacturing, LLC; Exhibit A5 U.S. Pat. No. 9,175,553 to McCann, et al vs. Asserted Claims of U.S. Pat. No. 10,844,697; dated Aug. 4, 2021; 26 pages.
Bear Manufacturing, LLC; Exhibit A6 U.S. Pat. No. 9,689,223 to Schacherer, et al vs. Asserted Claims of U.S. Pat. No. 10,844,697; dated Aug. 4, 2021; 8 pages.
Bear Manufacturing, LLC; Exhibit A7 WO 2014/089194 to Rogman, et al vs. Asserted Claims of U.S. Pat. No. 10,844,697; dated Aug. 4, 2021; 16 pages.
Bear Manufacturing, LLC; Exhibit A8 U.S. Publication No. 2008/0073081 to Frazier, et al vs. Asserted Claims of U.S. Pat. No. 10,844,697; dated Aug. 4, 2021; 33 pages.
Bear Manufacturing, DynaEnergetics; Exhibit A9 U.S. Pat. No. 9,065,201 to Borgfeld, et al vs. Asserted Claims of U.S. Pat. No. 10,844,697; dated Aug. 4, 2021; 14 pages.
Bear Manufacturing, DynaEnergetics; Exhibit A14 U.S. Publication No. 2010/0065302 to Nesbitt vs. Asserted Claims of U.S. Pat. No. 10,844,697; dated Aug. 4, 2021; 15 pages.
drillingmatters.org; Definition of "sub"; dated Aug. 25, 2018; 2 pages.
DynaEnergeticsEurope GMBH, OSO Perforating, LLC, SWM International, LLC and Bear Manufacturing, LLC; Joint Claim Construction Statement for Northern District of Texas Civil Action Nos. 3:21-cv-00188, 3:21-cv-00192 and 3:21-cv-00185; dated Sep. 28, 2021; 29 pages.
DynaEnergetics Europe GMBH; Patent Owner's Preliminary Response for PGR2021-00078; dated Aug. 19, 2021; 114 pages.
DynaEnergetics Europe GMBH; Plaintiffs Preliminary Infringement Contentions for Civil Action No. 6:21-cv-01110; dated Jul. 6, 2021; 6 pages.
DynaEnergetics Europe, Gmbh; DynaEnergetics' Preliminary Claim Construction and Extrinsic Evidence for Civil Action No. 4:21-cv-00280; dated Aug. 4, 2021; 10 pages.
DynaEnergetics Europe; Plaintiffs Preliminary Infringment Contentions Civil Action No. 3:21-cv-00192-M; dated Jun. 18, 2021; 15 pages.
G&H Diversified Manufacturing, LP and DynaEnergetics Europe GMBH; Joint Claim Construction Statement for Civil Action No. 3:20-cv-00376; dated Jul. 8, 2021; 14 pages.
G&H Diversified Manufacturing, LP; Defendant G&H Diversified Manufacturing, LP's Answer to Counter-Claim Plaintiffs' Counter-Claims for Civil Action No. 3:20-cv-00376; dated Apr. 19, 2021; 13 pages.
G&H Diversified Manufacturing, LP; Defendants' Preliminary Invalidity Contentions for Civil Action No. 3:20-cv-00376; dated May 6, 2021; 20 pages.
G&H Diversified Manufacturing, LP; Plaintiff and Counterclaim Defendant G&H Diversified Manufacturing, LP and Counterclaim Defendant Yellow Jacket Oil Tools, LLC's First Supplemental Proposed Constructions; dated Jun. 24, 2021; 7 pages.
G&H Diversified Manufacturing, LP; Plaintiff and Counterclaim Defendant G&H Diversified Manufacturing, LP and Counterclaim Defendant Yellow Jacket Oil Tools, LLC's Proposed Constructions; dated Jun. 10, 2021; 7 pages.
G&H Diversified Manufacturing, LP; Redated Petition for Post Grant Review for PGR2021-00078; dated May 10, 2021; 20 pages.
G&H Diversified Manufacturing, LP; Reply to Preliminary Response for PGR No. PGR2021-00078; dated Sep. 14, 2021; 18 pages.
Geodynamics; Perforating Catalog; dated Mar. 5, 2020; 218 pages; https://www.perf.com/hubfs/PDF%20Files/PerforatingCatalog_03272020_SMS.pdf.
GR Energy Operating GP LLC, GR Energy Services Management, LP and GR Energy Services, LLC; Exhibit A U.S. Pat. No. 10,844,697 vs Castel; dated Aug. 30, 2021; 88 pages.
GR Energy Operating GP LLC, GR Energy Services Management, LP and GR Energy Services, LLC; Exhibit B U.S. Pat. No. 10,844,697 vs Goodman; dated Aug. 30, 2021; 36 pages.
GR Energy Operating GP LLC, GR Energy Services Management, LP and GR Energy Services, LLC; Exhibit C U.S. Pat. No. 10,844,697 vs Hromas; dated Aug. 30, 2021; 27 pages.
GR Energy Operating GP LLC, GR Energy Services Management, LP and GR Energy Services, LLC; Exhibit D U.S. Pat. No. 10,844,697 vs Boop 768; dated Aug. 30, 2021; 35 pages.
GR Energy Operating GP LLC, GR Energy Services Management, LP and GR Energy Services, LLC; Exhibit E U.S. Pat. No. 10,844,697 vs Boop 792; dated Aug. 30, 2021; 52 pages.
GR Energy Operating GP LLC, GR Energy Services Management, LP and GR Energy Services, LLC; Exhibit F U.S. Pat. No. 10,844,697 vs Boop 378; dated Aug. 30, 2021; 34 pages.
GR Energy Operating GP LLC, GR Energy Services Management, LP and GR Energy Services, LLC; Exhibit G U.S. Pat. No. 10,844,697 vs Bickford; dated Aug. 30, 2021; 7 pages.
GR Energy Operating GP LLC, GR Energy Services Management, LP and GR Energy Services, LLC; Exhibit H U.S. Pat. No. 10,844,697 vs Black; dated Aug. 30, 2021; 33 pages.
GR Energy Operating GP LLC, GR Energy Services Management, LP and GR Energy Services, LLC; Exhibit I U.S. Pat. No. 10,844,697 vs Rogman; dated Aug. 30, 2021; 59 pages.
GR Energy Operating GP LLC, GR Energy Services Management, LP and GR Energy Services, LLC; Exhibit J U.S. Pat. No. 10,844,697 vs Burton; dated Aug. 30, 2021; 57 pages.
Wetechnologies; Downhole Connectors, High Pressure HP / HT & Medium Pressure MP /MT; dated Apr. 3, 2016; http://wetechnologies.com/products/hp-ht-downhole/; 3 pages.
Wooley, Gary R.; Declaration in Support of Petition for Post Grant Review of U.S. Pat. No. 10,844,697 for PGR2021-00097; dated Jul. 17, 2021; 90 pages.
Yellow Jacket Oil Tools, LLC; Defendant Yellow Jacket Oil Tools, LLC's Answer to Plaintiffs' First Amended Complaint for Civil Action No. 6:20-cv-01110; dated Aug. 10, 2021; 13 pages.
Yellowjacket Oil Tools, LLC and G&H Diversified Manufacturing, LP; Defendants' Preliminary Invalidity Contentions for Civil Action No. 6:20-cv-01110-ADA; dated Aug. 30, 2021; 21 pages.
Yellowjacket Oil Tools, LLC and G&H Diversified Manufacturing, LP; Exhibit A-1 BakerHughes Select-Fire; dated Aug. 30, 2021; 33 pages.
Yellowjacket Oil Tools, LLC and G&H Diversified Manufacturing, LP; Exhibit A-10 U.S. Pat. No. 7,762,331 to Goodman; dated Aug. 30, 2021; 4 pages.
Yellowjacket Oil Tools, LLC and G&H Diversified Manufacturing, LP; Exhibit A-11 U.S. Patent Publication No. 2016 0084048 A1 to Harrigan et al.; dated Aug. 30, 2021; 4 pages.
Yellowjacket Oil Tools, LLC and G&H Diversified Manufacturing, LP; Exhibit A-12 U.S. Appl. No. 61/819,196 to Harrigan et al.; dated Aug. 30, 2021; 26 pages.
Yellowjacket Oil Tools, LLC and G&H Diversified Manufacturing, LP; Exhibit A-13 U.S. Pat. No. 9,874,083 to Logan; dated Aug. 30, 2021; 18 pages.

(56) References Cited

OTHER PUBLICATIONS

Yellowjacket Oil Tools, LLC and G&H Diversified Manufacturing, LP; Exhibit A-14 New Select-Fire System; dated Aug. 30, 2021; 33 pages.
Yellowjacket Oil Tools, LLC and G&H Diversified Manufacturing, LP; Exhibit A-15 U.S. Pat. No. 10,077,641 to Rogman; dated Aug. 30, 2021; 36 pages.
Yellowjacket Oil Tools, LLC and G&H Diversified Manufacturing, LP; Exhibit A-16 U.S. Appl. No. 61/733,129 to Rogman; dated Aug. 30, 2021; 55 pages.
Yellowjacket Oil Tools, LLC and G&H Diversified Manufacturing, LP; Exhibit A-17 U.S. Pat. No. 8,387,533 to Runkel; dated Aug. 30, 2021; 5 pages.
Yellowjacket Oil Tools, LLC and G&H Diversified Manufacturing, LP; Exhibit A-18 Schlumberger SafeJet; dated Aug. 30, 2021; 13 pages.
Yellowjacket Oil Tools, LLC and G&H Diversified Manufacturing, LP; Exhibit A-19 U.S. Pat. No. 7,226,303 to Shaikh; dated Aug. 30, 2021; 4 pages.
Yellowjacket Oil Tools, LLC and G&H Diversified Manufacturing, LP; Exhibit A-2 U.S. Pat. No. 6,506,083 to Bickford et al.; dated Aug. 30, 2021; 3 pages.
Yellowjacket Oil Tools, LLC and G&H Diversified Manufacturing, LP; Exhibit A-20 U.S. Pat. No. 8,943,943 to Carlos Jose Tassaroli; dated Aug. 30, 2021; 7 pages.
Yellowjacket Oil Tools, LLC and G&H Diversified Manufacturing, LP; Exhibit A-3 U.S. Patent Pub. No. US 2012/0247771 A1 to Black et al.; dated Aug. 30, 2021; 30 pages.
Yellowjacket Oil Tools, LLC and G&H Diversified Manufacturing, LP; Exhibit A-4 U.S. Pat. No. 4,457,383 to Gene T. Boop; dated Aug. 30, 2021; 22 pages.
Yellowjacket Oil Tools, LLC and G&H Diversified Manufacturing, LP; Exhibit A-5 U.S. Pat. No. 3,173,229 to Gene T. Boop; dated Aug. 30, 2021; 12 pages.
Yellowjacket Oil Tools, LLC and G&H Diversified Manufacturing, LP; Exhibit A-6 U.S. Pat. No. 9,065,201 to Borgfeld et al.; dated Aug. 30, 2021; 3 pages.
Yellowjacket Oil Tools, LLC and G&H Diversified Manufacturing, LP; Exhibit A-7 U.S. Pat. No. 6,582,251 to Burke et al.; dated Aug. 30, 2021; 3 pages.
Yellowjacket Oil Tools, LLC and G&H Diversified Manufacturing, LP; Exhibit A-8 U.S. Patent Publication No. 2013/0126237 A1 to Burton; dated Aug. 30, 2021; 3 pages.
Yellowjacket Oil Tools, LLC and G&H Diversified Manufacturing, LP; Exhibit A-9 Selective perforation: A Game Changer in Peforating Technology—Case Study; dated Aug. 30, 2021; 13 pages.
Canadian Intellectual Property Office; Office Action for CA Application No. 3,070,118; dated Nov. 17, 2021; 3 pages.
Patent Trial and Appeals Board; Decision Granting Institution of Post Grant Review, PGR No. PGR2021-00097; dated Jan. 6, 2022; 92 pages.
United States Patent and Trademark Office; Final Office Action for U.S. Appl. No. 16/809,729; dated Nov. 18, 2021; 16 pages.
United States Patent and Trademark Office; Notice of Allowance for U.S. Appl. No. 17/221,219; dated Jan. 13, 2022; 11 pages.
AEL Intelligent Blasting, Electronic Delay Detonators, Electronic Initiators, Product Catalogue 2018, 21 pgs., https://www.aelworld.com/application/files/6915/4442/8861/ael-intelligent-blasting-differentitated-products-electronic-delay-detonators.pdf.
Canadian Intellectual Property Office; Office Action for CA Application No. 2,941,648; dated Jul. 12, 2021; 3 pages.
Nextier Completion Solutions; Plaintiffs Preliminary Invalidity Contentions for Civil Action No. 4:21-cv-01328; dated Jun. 30, 2021; 19 pages.
Nexus Perforating LLC; Invalidity Contentions for Civil Action No. 4:21-cv-00280; dated Jun. 30, 2021; 44 pages.
Orlca, Uni Tronic 600 Electronic Blasting System, Technical Data Sheet, Jun. 19, 2016, 2 pgs., www.oricaminingservices.com/download/file_id_19567/.
Schlumberger; 3.12-in Frac Gun; dated 2007; 2 pages.
Yellowjacket Oil Tools, LLC and G&H Diversified Manufacturing, LP; Defendants' Preliminaray Invalidity Contentions for Civil Action No. 6:20-cv-01110-ADA; dated May 6, 2021; 20 pages.
GR Energy Operating GP LLC, GR Energy Services Management, LP and GR Energy Services, LLC; Exhibit K U.S. Pat. No. 10,844,697 vs Borgfeld; dated Aug. 30, 2021; 36 pages.
GR Energy Operating GP LLC, GR Energy Services Management, LP and GR Energy Services, LLC; Exhibit L U.S. Pat. No. 10,844,697 vs Boop '383; dated Aug. 30, 2021; 24 pages.
GR Energy Operating GP LLC, GR Energy Services Management, LP and GR Energy Services, LLC; Exhibit M U.S. Pat. No. 10,844,697 vs Boop '992; dated Aug. 30, 2021; 14 pages.
GR Energy Operating GP LLC, GR Energy Services Management, LP and GR Energy Services, LLC; Exhibit N U.S. Pat. No. 10,844,697 vs Deere; dated Aug. 30, 2021; 14 pages.
GR Energy Operating GP LLC, GR Energy Services Management, LP and GR Energy Services, LLC; Exhibit O U.S. Pat. No. 10,844,697 vs Harrigan Provisional; dated Aug. 30, 2021; 26 pages.
GR Energy Operating GP LLC, GR Energy Services Management, LP and GR Energy Services, LLC; Exhibit P U.S. Pat. No. 10,844,697 vs Burke '251; dated Aug. 30, 2021; 7 pages.
GR Energy Operating GP LLC, GR Energy Services Management, LP and GR Energy Services, LLC; Exhibit Q U.S. Pat. No. 10,844,697 vs Runkel; dated Aug. 30, 2021; 7 pages.
GR Energy Operating GP LLC, GR Energy Services Management, LP and GR Energy Services, LLC; Exhibit R U.S. Pat. No. 10,844,697 vs Tassaroli; dated Aug. 30, 2021; 10 pages.
GR Energy Operating GP LLC, GR Energy Services Management, LP and GR Energy Services, LLC; Exhibit S U.S. Pat. No. 10,844,697 vs Harrigan '048; dated Aug. 30, 2021; 7 pages.
GR Energy Operating GP LLC, GR Energy Services Management, LP and GR Energy Services, LLC; Exhibit T U.S. Pat. No. 10,844,697 vs Select-Fire System; dated Aug. 30, 2021; 36 pages.
GR Energy Operating GP LLC, GR Energy Services Management, LP and GR Energy Services, LLC; Exhibit U U.S. Pat. No. 10,844,697 vs New Select-Fire System; dated Aug. 30, 2021; 37 pages.
GR Energy Operating GP LLC, GR Energy Services Management, LP and GR Energy Services, LLC; Exhibit V U.S. Pat. No. 10,844,697 vs EWAPS; dated Aug. 30, 2021; 17 pages.
GR Energy Operating GP LLC, GR Energy Services Management, LP and GR Energy Services, LLC; Exhibit W U.S. Pat. No. 10,844,697 vs SafeJet System; dated Aug. 30, 2021; 17 pages.
GR Energy Operating GP LLC, GR Energy Services Management, LP and GR Energy Services, LLC; GR Energy's Preliminary Invalidity Contentions for Civil Action No. 6:21-cv-00085-ADA; dated Aug. 30, 2021; 18 pages.
Guedes, Carlos; Signed Response Authenticating Documents for Civil Action No. 3-20-cv-000376; dated Jul. 13, 2021; 20 pages.
Hawes, Erik C.; Swm and NexTier Stipulation Letter; dated Jul. 20, 2021; 2 pages.
Heard, Preston; Declaration for PGR2021-00078; dated Aug. 19, 2021; 5 pages.
Horizontal Wireline Services, LLC and Allied Wireline Services, LLC; Defendants' Preliminary Invalidity Contentions for Civil Action No. 6:21-cv-00349-ADA; dated Aug. 30, 2021; 22 pages.
Horizontal Wireline Services, LLC and Allied Wireline Services, LLC; Exhibit A1 U.S. Pat. No. 5,155,293 to Barton vs. Asserted Claims of U.S. Pat. No. 10,844,697; dated Aug. 30, 2021; 21 pages.
Horizontal Wireline Services, LLC and Allied Wireline Services, LLC; Exhibit A10 U.S. Publication No. 8,869,887 to Deere, et al. vs. Asserted Claims of U.S. Pat. No. 10,844,697; dated Aug. 30, 2021; 10 pages.
Horizontal Wireline Services, LLC and Allied Wireline Services, LLC; Exhibit A11 U.S. Pat. No. 4,457,383 to Boop vs. Asserted Claims of U.S. Pat. No. 10,844,697; dated Aug. 30, 2021; 22 pages.
Horizontal Wireline Services, LLC and Allied Wireline Services, LLC; Exhibit A12 U.S. Patent Application Pub. No. 2012/0247771 to Black, et al. vs. Asserted Claims of U.S. Pat. No. 10,844,697; dated Aug. 30, 2021; 26 pages.

(56) References Cited

OTHER PUBLICATIONS

Horizontal Wireline Services, LLC and Allied Wireline Services, LLC; Exhibit A13 U.S. Publication No. 2016/0084048 to Harrigan, et al. vs. Asserted Claims of U.S. Pat. No. 10,844,697; dated Aug. 30, 2021; 14 pages.
Horizontal Wireline Services, LLC and Allied Wireline Services, LLC; Exhibit A14 U.S. Patent Application No. 2010/0065302 to Nesbitt vs. Asserted Claims of U.S. Pat. No. 10,844,697; dated Aug. 30, 2021; 15 pages.
Horizontal Wireline Services, LLC and Allied Wireline Services, LLC; Exhibit A15 U.S. Pat. No. 3,173,992 to Boop vs. Asserted Claims of U.S. Pat. No. 10,844,697; dated Aug. 30, 2021; 17 pages.
Horizontal Wireline Services, LLC and Allied Wireline Services, LLC; Exhibit A16 U.S. Pat. No. 6,506,083 to Bickford, et al. vs. Asserted Claims of U.S. Pat. No. 10,844,697; dated Aug. 30, 2021; 17 pages.
Horizontal Wireline Services, LLC and Allied Wireline Services, LLC; Exhibit A17 U.S. Pat. No. 8,387,533 to Runkel vs. Asserted Claims of U.S. Pat. No. 10,844,697; dated Aug. 30, 2021; 16 pages.
Horizontal Wireline Services, LLC and Allied Wireline Services, LLC; Exhibit A18 U.S. Pat. No. 8,943,943 to Tassaroli vs. Asserted Claims of U.S. Pat. No. 10,844,697; dated Aug. 30, 2021; 7 pages.
Horizontal Wireline Services, LLC and Allied Wireline Services, LLC; Exhibit A19 U.S. Pat. No. 7,762,331 to Goodman. vs. Asserted Claims of U.S. Pat. No. 10,844,697; dated Aug. 30, 2021; 28 pages.
Horizontal Wireline Services, LLC and Allied Wireline Services, LLC; Exhibit A2 U.S. Pat. No. 6,582,251 to Burke, et al. vs. Asserted Claims of U.S. Pat. No. 10,844,697; dated Aug. 30, 2021; 15 pages.
Horizontal Wireline Services, LLC and Allied Wireline Services, LLC; Exhibit A20 U.S. Patent Application No. 2012/0199352 to Lanclos vs. Asserted Claims of U.S. Pat. No. 10,844,697; dated Aug. 30, 2021; 24 pages.
Horizontal Wireline Services, LLC and Allied Wireline Services, LLC; Exhibit A21 "3.12-in Frac Gun" Publication and 3.12-in Frac Gun System, both by Schlumberger vs. Asserted Claims of U.S. Pat. No. 10,844,697; dated Aug. 30, 2021; 26 pages.
Horizontal Wireline Services, LLC and Allied Wireline Services, LLC; Exhibit A22 "New Select-Fire System" Publication and Select-Fire System, both by BakerHughes vs. Asserted Claims of U.S. Pat. No. 10,844,697; dated Aug. 30, 2021; 14 pages.
Horizontal Wireline Services, LLC and Allied Wireline Services, LLC; Exhibit A23 Amit Govil, "Selective Perforation: A Game Changer in Perforating Technology—Case Study," 2012 European and West African Perforating Symposium vs. Asserted Claims of U.S. Pat. No. 10,844,697; dated Aug. 30, 2021; 17 pages.
Horizontal Wireline Services, LLC and Allied Wireline Services, LLC; Exhibit A24 Schlumberger SafeJet System vs. Asserted Claims of U.S. Pat. No. 10,844,697; dated Aug. 30, 2021; 26 pages.
Horizontal Wireline Services, LLC and Allied Wireline Services, LLC; Exhibit A3 U.S. Pat. No. 7,901,247 to Ring vs. Asserted Claims of U.S. Pat. No. 10,844,697; dated Aug. 30, 2021; 19 pages.
Horizontal Wireline Services, LLC and Allied Wireline Services, LLC; Exhibit A4 U.S. Pat. No. 9,145,764 to Burton, et al. vs. Asserted Claims of U.S. Pat. No. 10,844,697; dated Aug. 30, 2021; 18 pages.
Horizontal Wireline Services, LLC and Allied Wireline Services, LLC; Exhibit A5 U.S. Pat. No. 9,175,553 to Mcann, et al. vs. Asserted Claims of U.S. Pat. No. 10,844,697; dated Aug. 30, 2021; 26 pages.
Horizontal Wireline Services, LLC and Allied Wireline Services, LLC; Exhibit A6 U.S. Pat. No. 9,689,223 to Schacherer vs. Asserted Claims of U.S. Pat. No. 10,844,697; dated Aug. 30, 2021; 8 pages.
Horizontal Wireline Services, LLC and Allied Wireline Services, LLC; Exhibit A7 International (PCT) Publication No. WO2014/089194 to Rogman, et al. vs. Asserted Claims of U.S. Pat. No. 10,844,697; dated Aug. 30, 2021; 16 pages.
Horizontal Wireline Services, LLC and Allied Wireline Services, LLC; Exhibit A8 U.S. Patent Application Pub. No. 2008/0073081 to Frazier, et al. vs. Asserted Claims of U.S. Pat. No. 10,844,697; dated Aug. 30, 2021; 33 pages.
Horizontal Wireline Services, LLC and Allied Wireline Services, LLC; Exhibit A9 U.S. Pat. No. 9,065,201 to Borgfeld, et al. vs. Asserted Claims of U.S. Pat. No. 10,844,697; dated Aug. 30, 2021; 14 pages.
Hunting Titan, Inc.; Defendant's Answer, Affirmative Defenses, and Counterclaims to Plaintiffs' Second Amended Complaint for Civil Action No. 4:20-cv-02123; dated Sep. 10, 2021; 77 pages.
Hunting Titan, Inc.; Defendant's Responsive Claim Construction Brief for Civil Action No. 4:20-cv-02123; dated Oct. 1, 2021; 31 pages.
Hunting Titan, Inc; Petitioner's Sur-Reply on Patent Owner's Motion to Amend for IPR No. 2018-00600; dated Apr. 11, 2019; 17 pages.
Hunting Titan; ControlFire; dated Jan. 5, 2017; 20 pages; http://www.hunting-intl.com/media/2666029/Hunting%20ControlFire%20Presentation_Public11.pdf.
Hunting; Payload: Preloaded Perforating Guns; 2 pages; http://www.hunting-intl.com/titan/perforating-guns/payload-preloaded-perforating-guns.
International Searching Authority; International Search Report and Written Opinion for International Application No. PCT/US2020/032879; dated Aug. 20, 2020; 9 pages.
JPT; New Instrumented Docketing Gun System Maximizes Perforating Performance; dated Aug. 31, 2018 7 pages; https://jpt.spe.org/new-instrumented-docking-gun-system-maximizes-perforating-performance.
Logan, et al.; International Patent Application No. PCT/CA2013/050986; dated Dec. 18, 2013; 54 pages.
OSO Perforating, LLC; Exhibit A7 WO 2014/089194 to Rogman, et al. vs. Asserted Claims of U.S. Pat. No. 10,844,697; dated Aug. 4, 2021; 16 pages.
OSO Perforating, LLC; Exhibit A8 U.S. Publication No. 2008/0073081 to Frazier, et al. vs. Asserted Claims of U.S. Pat. No. 10,844,697; dated Aug. 4, 2021; 33 pages.
OSO Perforating, LLC; Exhibit A9 U.S. Pat. No. 9,065,201 to Borgfeld, et al. vs. Asserted Claims of U.S. Pat. No. 10,844,697; dated Aug. 4, 2021; 14 pages.
PerfX Wireline Services, LLC; PerfX Wireline Services, LLC's Preliminary Invalidity Contentions for Civil Action No. 1:20-CV-03665; dated Jul. 2, 2021; 4 pages.
PerfX Wireline Services, LLC; Invalidity Chart for U.S. Pat. No. 10,844,697 in view of the Dynawell Gun System Exhibit A; dated Jul. 2, 2021; 42 pages.
PerfX Wireline Services, LLC; Invalidity Chart for U.S. Pat. No. 10,844,697 in view of the LRI Gun System Exhibit B; dated Jul. 2, 2021; 33 pages.
PerfX Wireline Services, LLC; Invalidity Chart for U.S. Pat. No. 10,844,697 in view of the Owen Oil Tools System Exhibit C; dated Jul. 2, 2021; 64 pages.
PerfX Wireline Services, LLC; Invalidity Chart for U.S. Pat. No. 10,844,697 in view of the Select Fire System Exhibit D; dated Jul. 2, 2021; 49 pages.
PerfX Wireline Services, LLC; Invalidity Chart for U.S. Pat. No. 10,844,697 in view of U.S. Pat. No. 10,077,641 Exhibit H; dated Jul. 2, 2021; 41 pages.
PerfX Wireline Services, LLC; Invalidity Chart for U.S. Pat. No. 10,844,697 in view of U.S. Pat. No. 4,007,796 Exhibit F; dated Jul. 2, 2021; 40 pages.
PerfX Wireline Services, LLC; Invalidity Chart for U.S. Pat. No. 10,844,697 in view of U.S. Pat. No. 5,042,594 Exhibit E; dated Jul. 2, 2021; 38 pages.
PerfX Wireline Services, LLC; Invalidity Chart for U.S. Pat. No. 10,844,697 in view of U.S. Pat. No. 9,145,764 Exhibit G; dated Jul. 2, 2021; 58 pages.
PerfX's Wireline Services, LLC; Exhibit A-1: Invalidity Chart for U.S. Pat. No. 10,844,697 in view of the Dynawell Gun System; dated Aug. 30, 2021; 30 pages.
PerfX's Wireline Services, LLC; Exhibit A-2: Invalidity Chart for U.S. Pat. No. 10,844,697 in view of the LRI Gun System; dated Aug. 30, 2021; 29 pages.

(56) References Cited

OTHER PUBLICATIONS

PerfX's Wireline Services, LLC; Exhibit A-3: Invalidity Chart for U.S. Pat. No. 10,844,697 in view of the Owen Oil Tools System; dated Aug. 30, 2021; 42 pages.
PerfX's Wireline Services, LLC; Exhibit A-4: Invalidity Chart for U.S. Pat. No. 10,844,697 in view of the Select Fire System; dated Aug. 30, 2021; 32 pages.
PerfX's Wireline Services, LLC; Exhibit A-5: Invalidity Chart for U.S. Pat. No. 10,844,697 in view of U.S. Pat. No. 5,042,594; dated Aug. 30, 2021; 27 pages.
PerfX's Wireline Services, LLC; Exhibit A-6: Invalidity Chart for U.S. Pat. No. 10,844,697 in view of U.S. Pat. No. 4,007,796; dated Aug. 30, 2021; 23 pages.
PerfX's Wireline Services, LLC; Exhibit A-7: Invalidity Chart for U.S. Pat. No. 10,844,697 in view of U.S. Pat. No. 9,145,764; dated Aug. 30, 2021; 36 pages.
PerfX's Wireline Services, LLC; Exhibit A-8: Invalidity Chart for U.S. Pat. No. 10,844,697 in view of U.S. Pat. No. 10,077,6414; dated Aug. 30, 2021; 29 pages.
PerfX's Wireline Services, LLC; Exhibit A-9: Invalidity Chart for U.S. Pat. No. 10,844,697 in view of the SafeJet System; dated Aug. 30, 2021; 18 pages.
Rodgers, John; Claim Construction Declaration for Civil Action No. 3:21-cv-00185; dated Sep. 28, 2021; 41 pages.
Rodgers, John; Claim Construction Declaration for Civil Action No. 3:21-cv-00188; dated Sep. 28, 2021; 42 pages.
Rodgers, John; Declaration for Civil Action No. 3:20-CV-00376; dated Jul. 8, 2021; 32 pages.
Rodgers, John; Declaration for Civil Action No. 3:21-cv-00192-M; dated May 27, 2021; 42 pages.
Rodgers, John; Declaration for PGR2021-00078; dated Aug. 19, 2021; 137 pages.
Salt, et al.; New Perforating Gun System Increases Saftey and Efficiency; Journal of Petroleum Technology; dated Apr. 1, 2016; Weatherford; https://jpt.spe.org/new-perforating-gun-system-increases-safety-and-efficiency; 11 pages.
Schlumberger; Field Test Database Print Out Showing uses of the SafeJet System; dated May 11, 2015; 10 pages.
Science Direct; Perforating Gun Well-Bore Construction (Drilling and Completions); dated Jul. 20, 2021; 13 pages.
SWM International, LLC and Nextier Oil Completion Solutions, LLC; Petition for Post Grant Review PGR No. 2021-00097; dated Jul. 20, 2021; 153 pages.
SWM International, LLC; Defendant's P.R. 3-3 and 3-4 Preliminary Invalidity Contentions; dated Aug. 4, 2021; 28 pages.
SWM International, LLC; Defendant's P.R. 4-1 Disclosure of Proposed Terms and Claim Elements for Construction for Civil Action No. 3:21-cv-00192-M; dated Aug. 24, 2021; 5 pages.
SWM International, LLC; Ex. A-1 Invalidity of U.S. Pat. No. 10,844,697 Over the SafeJet System; dated Aug. 4, 2021; 15 pages.
SWM International, LLC; Ex. A-1A Invalidity of U.S. Pat. No. 10,844,697 Over the SafeJet System in view of Backhus; dated Aug. 4, 2021; 4 pages.
SWM International, LLC; Ex. A-1B Invalidity of U.S. Pat. No. 10,844,697 Over the SafeJet System in view of Harrigan; dated Aug. 4, 2021; 3 pages.
SWM International, LLC; Ex. A-2 Invalidity of U.S. Pat. No. 10,844,697 Over Goodman; dated Aug. 4, 2021; 11 pages.
SWM International, LLC; Ex. A-2A Invalidity of U.S. Pat. No. 10,844,697 Over Goodman in view of Backhus; dated Aug. 4, 2021; 3 pages.
SWM International, LLC; Ex. A-2B Invalidity of U.S. Pat. No. 10,844,697 Over Goodman in view of Harrigan; dated Aug. 4, 2021; 3 pages.
SWM International, LLC; Ex. A-3 Invalidity of U.S. Pat. No. 10,844,697 Over Harrigan; dated Aug. 4, 2021; 13 pages.
SWM International, LLC; Ex. A-4 Invalidity of U.S. Pat. No. 10,844,697 Over Burton; dated Aug. 4, 2021; 11 pages.
SWM International, LLC; Ex. A-5 Invalidity of U.S. Pat. No. 10,844,697 Over Rogman; dated Aug. 4, 2021; 10 pages.

TOLTEQ; iSeries MWD System; dated 2021; 9 pages.
United States District Court for the Southern District of Texas; Joint Claim Construction Statement for Civil Action No. 3:20-cv-00376; dated Jul. 8, 2021; 14 pages.
United States District Court for the Southern District of Texas; Joint Claim Construction Statement for Civil Action No. 4:20-cv-02123; dated Aug. 27, 2021; 14 pages.
United States District Court for the Western District of Texas; Order Granting in Part & Denying on Part Defendants' Motion to Dismiss for Improper Venue or to Transfer Venue Pursuant to 28 U.S.C. § 1404(a) for Civil Action No. 6:20-CV-01110-ADA; dated Aug. 5, 2021; 16 pages.
United States Patent and Trademark Office; Final Office Action for U.S. Appl. No. 17/221,219; dated Aug. 24, 2021; 14 pages.
United States Patent and Trademark Office; Notice of Allowance for U.S. Appl. No. 15/920,812; dated Aug. 4, 2021; 5 pages.
United States Patent and Trademark Office; Patent Assignment for U.S. Appl. No. 61/733,129; dated Jan. 25, 2013; 2 pages.
U.S. Appl. No. 61/739,592; dated Dec. 19, 2012; 65 pages.
United States Patent Trial and Appeal Board; Record of Oral Hearing held Feb. 18, 2020 for IPR dated 2018-00600; dated Feb. 18, 2020; 27 pages.
Brinsden, Mark; Declaration of Mark Brinsden; dated Sep. 30, 2021; 51 pages.
DynaEnergetics Europe, GMBH; Patent Owner's Preliminary Response for PGR No. 2021-00097; dated Oct. 29, 2021; 110 pages.
Fayard, Alfredo; Declaration of Alfredo Fayard; dated Oct. 18, 2021; 13 pages.
G&H Diversified Manufacturing, LP; Defendant G&H Diversified Manufacturing, LP's Opening Claim Construction Brief; dated Oct. 18, 2021; 25 pages.
GR Energy Services Operating GP LLC, GR Energy Services Management, LP and GR Energy Services, LLC; GR Energy's Opening Claim Construction Brief; dated Oct. 18, 2021; 23 pages.
Horizontal Wireline Services, LLC and Allied Wireline Services, LLC; Defendants' Opening Claim Construction Brief; dated Oct. 18, 2021; 27 pages.
Hunting Titan, Inc.; Defendant's Supplemental Brief on Claim Construction; dated Nov. 5, 2021; 9 pages.
Meehan, Nathan; Declaration of D. Nathan Meehan, Ph.D, P.E; dated Oct. 18, 2021; 86 pages.
Nextier Completion Solutions Inc.; Defendant NexTier Completion Solution Inc.'s Opening Claim Construction Brief; dated Oct. 18, 2021; 26 pages.
Norwegian Industrial Property Office; Office Action for NO Application No. 20210799; dated Oct. 30, 2021; 2 pages.
PerfX Wireline Services, LLC; Defendant PerfX Wireline Services, LLC's Opening Claim Construction Brief; dated Oct. 18, 2021; 23 pages.
Rodgers, John; Declaration of John Rodgers, Ph.D for PGR Case No. PGR2021-00097; dated Oct. 28, 2021; 124 pages.
Rodgers, John; Videotaped Deposition of John Rodgers; dated Jul. 29, 2021; 49 pages.
Shelby Sullivan; Declaration of Shelby Sullivan; dated Oct. 18, 2021; 9 pages.
United States Patent and Trademark Office; Decision Granting Institution of Post-Grant Review 35 U.S.C. § 324 for PGR2021-00078; dated Nov. 1, 2021; 87 pages.
United States Patent and Trademark Office; Non-Final Office Action for U.S. Appl. No. 17/352,728; dated Oct. 25, 2021; 9 pages.
United States Patent and Trademark Office; Notices of Allowabilty for U.S. Appl. No. 16/585,790; dated Jul. 31, 2020 and Mar. 18, 2020; Response to Office Action for U.S. Appl. No. 16/585,790; dated Nov. 12, 2019; 26 pages.
United States Patent and Trademark Office; Office Action and Response to Office Action for U.S. Appl. No. 16/585,790; dated Nov. 12, 2019 and Feb. 12, 2020; 21 pages.
United States Patent and Trademark Office; Order Granting Request for Ex Parte Reexamination; dated Nov. 1, 2021; 14 pages.
Williams, John; Declaration of Dr. John Williams; dated Oct. 18, 2021; 9 pages.

(56) References Cited

OTHER PUBLICATIONS

Wooley, Gary; Declaration of Gary E. Wooley for Civil Action Nos. 6:20-cv-01110-ADA and 6:20-CV-01201-ADA; dated Oct. 18, 2021; 12 pages.
Wooley, Gary; Declaration of Gary R. Wooley for Civil Action No. 3:20-cv-00376; dated Jul. 8, 2021; 11 pages.
Wooley, Gary; Declaration of Gary R. Wooley for Civil Action No. 3:21-cv-00192-M; dated Aug. 17, 2021; 18 pages.
Wooley, Gary; Transcript of Gary Wooley for Civil Action No. 3:21-cv-00192-M; dated Sep. 2, 2021; 26 pages.
Markel, Dan; Declaration regarding the SafeJet System for PGR2021-00097; dated Jul. 15, 2021; 21 pages.
New Oxford American Dictionary Third Edition; Definition of "end"; dated 2010; 3 pages.
Nextier Completion Solutions Inc.; Defendant Nextier Completion Solutions Inc.'s First Amended Answer and Counterclaims to Plaintiffs' First Amended Complaint for Civil Action No. 6:20-CV-01201; dated Jun. 28, 2021; 17 pages.
Nextier Completion Solutions Inc.; Defendant's Preliminary Invalidity Contentions for Civil Action No. 6:20-cv-01201-ADA; dated Aug. 30, 2021; 21 pages.
Nextier Completion Solutions Inc.; Exhibit A-1 BakerHughes Select-Fire; dated Aug. 30, 2021; 33 pages.
Nextier Completion Solutions Inc.; Exhibit A-10 U.S. Pat. No. 7,762,331 to Goodman; dated Aug. 30, 2021; 4 pages.
Nextier Completion Solutions Inc.; Exhibit A-11 U.S. Patent Publication No. 2016/0084048 A1 to Harrigan et al.; dated Aug. 30, 2021; 4 pages.
Nextier Completion Solutions Inc.; Exhibit A-12 U.S. Appl. No. 61/819,196 to Harrigan et al.; dated Aug. 30, 2021; 26 pages.
Nextier Completion Solutions Inc.; Exhibit A-13 U.S. Pat. No. 9,874,083 to Logan; dated Aug. 30, 2021; 18 pages.
Nextier Completion Solutions Inc.; Exhibit A-14 New Select-Fire System; dated Aug. 30, 2021; 33 pages.
Nextier Completion Solutions Inc.; Exhibit A-15 U.S. Pat. No. 10,077,641 to Rogman; dated Aug. 30, 2021; 36 pages.
Nextier Completion Solutions Inc.; Exhibit A-16 U.S. Appl. No. 61/733,129 to Rogman; dated Aug. 30, 2021; 55 pages.
Nextier Completion Solutions Inc.; Exhibit A-17 U.S. Pat. No. 8,387,533 to Runkel; dated Aug. 30, 2021; 5 pages.
Nextier Completion Solutions Inc.; Exhibit A-18 Schlumberger SafeJet; dated Aug. 30, 2021; 13 pages.
Nextier Completion Solutions Inc.; Exhibit A-19 U.S. Pat. No. 7,226,303 to Shaikh; dated Aug. 30, 2021; 4 pages.
Nextier Completion Solutions Inc.; Exhibit A-2 U.S. Pat. No. 6,506,083 to Bickford et al.; dated Aug. 30, 2021; 3 pages.
Nextier Completion Solutions Inc.; Exhibit A-20 U.S. Pat. No. 8,943,943 to Carlos Jose Tassaroli; dated Aug. 30, 2021; 7 pages.
Nextier Completion Solutions Inc.; Exhibit A-3 U.S. Patent Pub. No. US 2012/0247771 A1 to Black et al.; dated Aug. 30, 2021; 30 pages.
Nextier Completion Solutions Inc.; Exhibit A-4 U.S. Pat. No. 4,457,383 to Gene T. Boop; dated Aug. 30, 2021; 22 pages.
Nextier Completion Solutions Inc.; Exhibit A-5 U.S. Pat. No. 3,173,229 to Gene T. Boop; dated Aug. 30, 2021; 12 pages.
Nextier Completion Solutions Inc.; Exhibit A-6 U.S. Pat. No. 9,065,201 to Borgfeld et al.; dated Aug. 30, 2021; 3 pages.
Nextier Completion Solutions Inc.; Exhibit A-7 U.S. Pat. No. 6,582,251 to Burke et al.; dated Aug. 30, 2021; 3 pages.
Nextier Completion Solutions Inc.; Exhibit A-8 U.S. Patent Publication No. 2013/0126237 A1 to Burton; dated Aug. 30, 2021; 3 pages.
Nextier Completion Solutions Inc.; Exhibit A-9 Selective perforation: A Game Changer in Peforating Technology—Case Study; dated Aug. 30, 2021; 13 pages.
Nexus Perforating LLC; Nexus Preliminary Claim Construction and Extrinsic Evidence for Civil Action No. 4:21-cv-00280; dated Aug. 4, 2021; 6 pages.
Oilfield Glossary; Definition of Perforating Gun; dated Feb. 26, 2013; 2 pages.
oilgasglossary.com; Definition of "sub"; dated Nov. 20, 2008; 1 page.
Olsen, Steve; Declaration regarding the SafeJet System for PGR2021-00097; dated Jul. 16, 2021; 25 pages.
OSO Perforating, LLC; Defendant's Preliminary Invalidity Contentions for Civil Action No. 3:21-cv-00188-M; dated Aug. 4, 2021; 23 pages.
OSO Perforating, LLC; Exhibit A1 U.S. Pat. No. 5,155,293 to Barton vs. Asserted Claims of U.S. Pat. No. 10,844,697; dated Aug. 4, 2021; 21 pages.
OSO Perforating, LLC; Exhibit A10 U.S. Pat. No. 8,869,887 to Deere, et al. vs. Asserted Claims of U.S. Pat. No. 10,844,697; dated Aug. 4, 2021; 10 pages.
OSO Perforating, LLC; Exhibit A11 U.S. Pat. No. 4,457,383 to Boop. vs. Asserted Claims of U.S. Pat. No. 10,844,697; dated Aug. 4, 2021; 22 pages.
OSO Perforating, LLC; Exhibit A12 U.S. Publication No. 2012/0247771 to Black, et al. vs. Asserted Claims of U.S. Pat. No. 10,844,697; dated Aug. 4, 2021; 26 pages.
OSO Perforating, LLC; Exhibit A13 U.S. Publication No. 2016/0084048 to Harrigan, et al. vs. Asserted Claims of U.S. Pat. No. 10,844,697; dated Aug. 4, 2021; 14 pages.
OSO Perforating, LLC; Exhibit A14 U.S. Publication No. 2010/0065302 to Nesbitt vs. Asserted Claims of U.S. Pat. No. 10,844,697; dated Aug. 4, 2021; 15 pages.
OSO Perforating, LLC; Exhibit A15 U.S. Pat. No. 3,173,992 to Boop vs. Asserted Claims of U.S. Pat. No. 10,844,697; dated Aug. 4, 2021; 17 pages.
OSO Perforating, LLC; Exhibit A16 U.S. Pat. No. 6,506,083 to Bickford, et al. vs. Asserted Claims of U.S. Pat. No. 10,844,697; dated Aug. 4, 2021; 17 pages.
OSO Perforating, LLC; Exhibit A17 U.S. Pat. No. 8,387,533 to Runkel vs. Asserted Claims of U.S. Pat. No. 10,844,697; dated Aug. 4, 2021; 16 pages.
OSO Perforating, LLC; Exhibit A18 U.S. Pat. No. 8,943,943 to Tassaroli vs. Asserted Claims of U.S. Pat. No. 10,844,697; dated Aug. 4, 2021; 7 pages.
OSO Perforating, LLC; Exhibit A19 U.S. Pat. No. 7,762,331 to Goodman vs. Asserted Claims of U.S. Pat. No. 10,844,697; dated Aug. 4, 2021; 28 pages.
OSO Perforating, LLC; Exhibit A2 U.S. Pat. No. 6,582,251 to Burke, et al. vs. Asserted Claims of U.S. Pat. No. 10,844,697; dated Aug. 4, 2021; 15 pages.
OSO Perforating, LLC; Exhibit A20 U.S. Publication No. 2012/01999352 to Lanclos vs. Asserted Claims of U.S. Pat. No. 10,844,697; dated Aug. 4, 2021; 24 pages.
OSO Perforating, LLC; Exhibit A21 "3.12-in Frac Gun" Publication and 3.12-in Frac Gun System by Sclumberger vs. Asserted Claims of U.S. Pat. No. 10,844,697; dated Aug. 4, 2021; 26 pages.
OSO Perforating, LLC; Exhibit A22 "New Select-Fire System" Publication and Select-Fire System by BakerHughes vs. Asserted Claims of U.S. Pat. No. 10,844,697; dated Aug. 4, 2021; 14 pages.
OSO Perforating, LLC; Exhibit A23 Amit Govil, "Selective Perforation: A Game Changer in Perforating Technology—Case Study," 2012 European and West African Perforating Symposium ("EWAPS") vs. Asserted Claims of U.S. Pat. No. 10,844,697; dated Aug. 4, 2021; 17 pages.
OSO Perforating, LLC; Exhibit A24 Schlumberger SafeJet System vs. Asserted Claims of U.S. Pat. No. 10,844,697; dated Aug. 4, 2021; 26 pages.
OSO Perforating, LLC; Exhibit A3 U.S. Pat. No. 7,901,247 to Ring vs. Asserted Claims of U.S. Pat. No. 10,844,697; dated Aug. 4, 2021; 19 pages.
OSO Perforating, LLC; Exhibit A4 U.S. Pat. No. 9,145,764 to Burton, et al. vs. Asserted Claims of U.S. Pat. No. 10,844,697; dated Aug. 4, 2021; 18 pages.
OSO Perforating, LLC; Exhibit A5 U.S. Pat. No. 9,175,553 to McCann, et al. vs. Asserted Claims of U.S. Patenl No. 10,844,697; dated Aug. 4, 2021; 26 pages.
OSO Perforating, LLC; Exhibit A6 U.S. Pat. No. 9,689,223 to Schacherer, et al. vs. Asserted Claims of U.S. Pat. No. 10,844,697; dated Aug. 4, 2021; 8 pages.

(56) References Cited

OTHER PUBLICATIONS

G&H Diversified Manufacturing, LP; Petitioner's Oral Argument Presentation for PGR No. PGR2021-00078; dated Jul. 26, 2022; 65 pages.
Hunting Titan, Inc.; Defendant Hunting Titan, Inc.'s Opposition to Plaintiffs Motion for Summary Judgement for Civil Action No. 4:20-cv-02123; dated Mar. 30, 2022; 37 pages.
Hunting Titan, Inc.; Defendant Hunting Titan, Inc.'s Opposed Motion for Leave to Amend Invalidity Contentions for Civil Action No. 4:20-cv-02123; dated Nov. 19, 2021; 17 pages.
Hunting Titan, Inc.; Defendant's Final Invalidity Contentions for Civil Action No. 4:20-cv-02123; dated Jan. 7, 2022; 54 pages.
Hunting Titan, Inc.; Defendant's Preliminary Invalidity Contentions for Civil Action No. 4:20-cv-02123; dated Aug. 6, 2021; 52 pages.
Hunting Titan, Inc.; Exhibit 1 to Defendant Hunting Titan, Inc.'s Opposed Motion for Leave to Amend Invalidity Contentions for Civil Action No. 4:20-cv-02123; dated Nov. 19, 2021; 64 pages.
Hunting Titan, Inc.; Exhibit 3 to Defendant Hunting Titan, Inc.'s Opposed Motion for Leave to Amend Invalidity Contentions for Civil Action No. 4:20-cv-02123; dated Nov. 19, 2021; 24 pages.
Hunting Titan, Inc.; Exhibit 4 to Defendant Hunting Titan, Inc.'s Opposed Motion for Leave to Amend Invalidity Contentions for Civil Action No. 4:20-cv-02123; dated Nov. 19, 2021; 9 pages.
Hunting Titan, Inc.; Exhibit 5 to Defendant Hunting Titan, Inc.'s Opposed Motion for Leave to Amend Invalidity Contentions for Civil Action No. 4:20-cv-02123; dated Nov. 19, 2021; 5 pages.
Hunting Titan, Inc.; Exhibit 6 to Defendant Hunting Titan, Inc.'s Opposed Motion for Leave to Amend Invalidity Contentions for Civil Action No. 4:20-cv-02123; dated Nov. 19, 2021; 4 pages.
Hunting Titan, Inc.; Exhibit 7 to Defendant Hunting Titan, Inc.'s Opposed Motion for Leave to Amend Invalidity Contentions for Civil Action No. 4:20-cv-02123; dated Nov. 19, 2021; 6 pages.
Hunting Titan, Inc.; Exhibit A to Defendant's Preliminary Invalidity Contentions, Invalidity of U.S. Pat. No. 10,429,161; dated Aug. 6, 2021; 93 pages.
Hunting Titan, Inc.; Exhibit B to Defendant's Preliminary Invalidity Contentions, Invalidity of U.S. Pat. No. 10,472,938; dated Aug. 6, 2021; 165 pages.
Hunting Titan, Inc.; Exhibit C to Defendant's Final Invalidity Contentions, Invalidity of U.S. Pat. No. 10,429,161; dated Jan. 7, 2022; 3 pages.
Hunting Titan, Inc.; Exhibit D to Defendant's Final Invalidity Contentions, Invalidity of U.S. Pat. No. 10,472,938; dated Jan. 7, 2022; 6 pages.
SWM International, LLC and Nextier Completion Solutions Inc; Petitioner'S Reply to Patent Owner's Response to Petition for Case No. PGR2021-00097; dated Jul. 29, 2022; 36 pages.
United States Patent and Trademark Office; Ex Parte Quayle Action for U.S. Appl. No. 16/809,729; dated Jun. 20, 2022; 4 pages.
United States Patent and Trademark Office; Ex Parte Quayle Action for U.S. Appl. No. 17/352,728; dated Jun. 20, 2022; 6 pages.
United States Patent and Trademark Office; Non-Final Office Action for U.S. Appl. No. 17/007,574; dated May 6, 2022; 10 pages.
United States Patent and Trademark Office; Non-Final Office Action for U.S. Appl. No. 17/221,219; dated Aug. 3, 2022; 8 pages.
INPI Argentina; Office Action for Application No. 20190101834; dated Aug. 22, 2022; 3 pages.
INPI Argentina; Office Action for Application No. 20190101835; dated Aug. 29, 2022; 3 pages.
United States District Court for the Southern District of Texas; Memorandum Opinion and Order for Civil Action No. H-20-2123; dated Sep. 19, 2022; 115 pages.
United States Patent and Trademark Office; Notice of Allowance for U.S. Appl. No. 17/007,574; dated Sep. 26, 2022; 8 pages.
United States Patent and Trademark Office; Notice of Allowance for U.S. Appl. No. 17/358,101; dated Oct. 26, 2022; 8 pages.
United States Patent and Trial Appeal Board; Final Written Decision on PGR2021-00078; dated Oct. 28, 2022; 139 pages.
United States Patent and Trademark Office; Non-Final Office Action for U.S. Appl. No. 17/951,606 dated Jan. 17, 2023; 11 pages.

\* cited by examiner

DETONATOR POSITIONING DEVICE

CROSS-REFERENCE TO RELATED APPLICATIONS

This application is a continuation of U.S. application Ser. No. 16/026,431 filed Jul. 3, 2018, which is a continuation of U.S. application Ser. No. 15/117,228 filed Aug. 8, 2016 (now U.S. Pat. No. 10,188,990 issued Jan. 29, 2019), which claims priority to PCT Application No. PCT/US2015/018906 filed Mar. 5, 2015, which claims the benefit of U.S. Provisional Application No. 61/949,939 filed Mar. 7, 2014, each of which is incorporated herein by reference in its entirety. This application is a continuation-in-part of U.S. patent application Ser. No. 15/920,812 filed Mar. 14, 2018, which is a continuation of U.S. patent application Ser. No. 15/617,344 filed Jun. 8, 2017, which is a divisional patent application of U.S. patent application Ser. No. 15/287,309 filed Oct. 6, 2016 (now U.S. Pat. No. 9,702,680 issued Jul. 11, 2017), which is a divisional patent application of U.S. patent application Ser. No. 14/904,788 filed Jan. 13, 2016 (now U.S. Pat. No. 9,494,021 issued Nov. 15, 2016), which claims priority to PCT Application No. PCT/CA2014/050673 filed Jul. 16, 2014, which claims priority to Canadian Patent Application No. 2,821,506 filed Jul. 18, 2013, each of which is incorporated herein by reference in its entirety.

FIELD

A device and method for positioning a detonator within a perforating gun assembly is generally described.

BACKGROUND

Hydrocarbons, such as fossil fuels (e.g. oil) and natural gas, are extracted from underground wellbores extending deeply below the surface using complex machinery and explosive devices. Once the wellbore is established by placement of cases after drilling, a perforating gun assembly, or train or string of multiple perforating gun assemblies, are lowered into the wellbore, and positioned adjacent one or more hydrocarbon reservoirs in underground formations. The perforating gun has explosive charges, typically shaped, hollow or projectile charges, which are ignited to create holes in the casing and to blast through the formation so that the hydrocarbons can flow through the casing. Once the perforating gun(s) is properly positioned, a surface signal actuates an ignition of a fuse, which in turn initiates a detonating cord, which detonates the shaped charges to penetrate/perforate the casing and thereby allow formation fluids to flow through the perforations thus formed and into a production string. The surface signal typically travels from the surface along electrical wires that run from the surface to one or more detonators positioned within the perforating gun assembly.

Assembly of a perforating gun requires assembly of multiple parts, which typically include at least the following components: a housing or outer gun barrel within which is positioned an electrical wire for communicating from the surface to initiate ignition, a percussion initiator and/or a detonator, a detonating cord, one or more charges which are held in an inner tube, strip or carrying device and, where necessary, one or more boosters. Assembly typically includes threaded insertion of one component into another by screwing or twisting the components into place, optionally by use of a tandem adapter. Since the electrical wire must extend through much of the perforating gun assembly, it is easily twisted and crimped during assembly. In addition, when a wired detonator is used it must be manually connected to the electrical wire, which has lead to multiple problems. Due to the rotating assembly of parts, the wires can become torn, twisted and/or crimped/nicked, the wires may be inadvertently disconnected, or even mis-connected in error during assembly, not to mention the safety issues associated with physically and manually wiring live explosives.

According to the prior art and as shown in FIG. 1, the wired detonator 60 has typically been configured such that wires must be physically, manually connected upon configuration of the perforating gun assembly. As shown herein, the wired detonator 60 typically has three (or more or less) wires, which require manual, physical connection once the wired detonator is placed into the perforating gun assembly. For detonators with a wired integrated switch for selective perforating, the wires typically include at least a signal-in wire 61, a signal-out wire 62 and a ground wire 63. In a typical manual, physical connection, the wires extending along the perforating gun are matched to the wires of the detonator, and an inner metallic portion of one wire is twisted together with an inner metallic portion of the matched wire using an electrical connector cap 64 or wire nut or a scotch-lock type connector.

What is needed is a detonator positioning device capable of positioning a wireless detonator including a spring-contact, single wire (not two or more wires as described above) connection within a perforating gun assembly, particularly a typical perforating gun assembly that has traditionally used a fully-wired detonator.

BRIEF DESCRIPTION

An embodiment provides a detonator positioning device for positioning a detonator in a perforating gun assembly. In an embodiment, the detonator positioning device is formed of a multi-part cylindrical body.

Another embodiment provides a perforating gun assembly including the detonator positioning device for positioning a wireless detonator.

Another embodiment provides a method of assembling the perforating gun assembly including a detonator positioning device and a detonator.

BRIEF DESCRIPTION OF THE FIGURES

A more particular description will be rendered by reference to specific embodiments thereof that are illustrated in the appended drawings. Understanding that these drawings depict only typical embodiments and are not therefore to be considered to be limiting of its scope, exemplary embodiments will be described and explained with additional specificity and detail through the use of the accompanying drawings in which.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to embodiments.

DETAILED DESCRIPTION

Reference will now be made in detail to various embodiments. Each example is provided by way of explanation, and is not meant as a limitation and does not constitute a definition of all possible embodiments.

A detonator is provided that is capable of being positioned or placed into a perforating gun assembly with minimal effort by means of placement/positioning within a detonator positioning device according to an aspect. In an embodiment, the detonator positioning device includes a detonator positioned within the detonator positioning device, wherein the detonator electrically contactably forms an electrical connection with minimal need to manually and physically connect, cut or crimp multiple wires as required in a fully wired electrical connection. Such a wireless detonator has been generally described in commonly assigned DE Application No. 102013109227.6 filed Aug. 26, 2013, which is incorporated herein by reference in its entirety. In other words, the electrical connection is made only by making electrical contact with electrically contactable components as described in greater detail hereinbelow . . . that is by merely physically touching. Thus, as used herein, the term "wireless" means that the detonator itself is not manually, physically connected within the perforating gun assembly as has been traditionally done with wired connections, but rather merely makes electrical contact through various components as described herein to form the electrical connections. Thus, the signal is not being wirelessly transmitted, but is rather being relayed through electrical cables/wiring within the perforating gun assembly through the electrical contacts. In particular, the electrical connection is made through contact between a line-in contact-initiating pin 38 and a line-in portion 20 as described in greater detail below.

Figure 1:
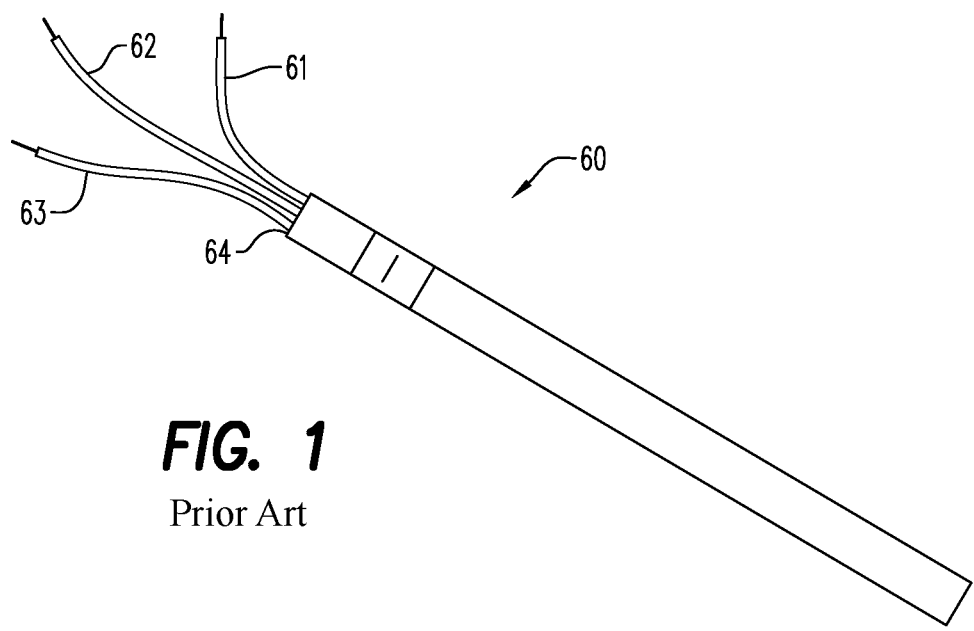
FIG. 1 is a perspective view of a wired detonator according to the prior art.
Figure 2:
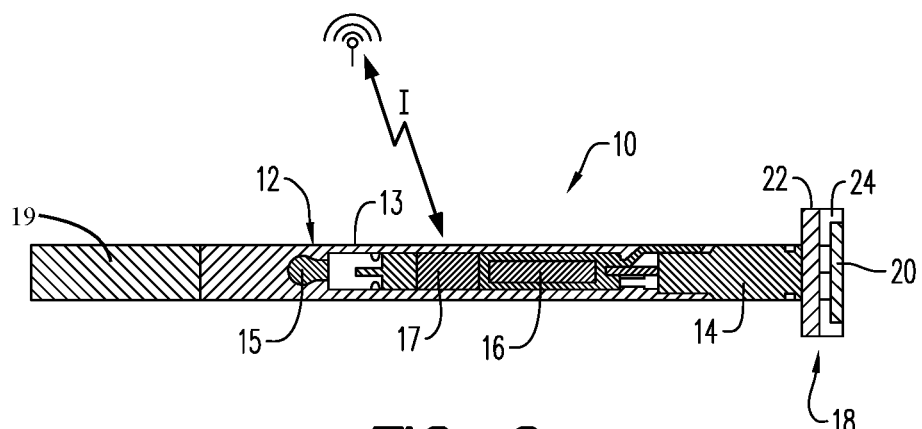
FIG. 2 is a cross-sectional side view of a wireless detonator useful with a detonator positioning device, according to an embodiment.
Figure 3:
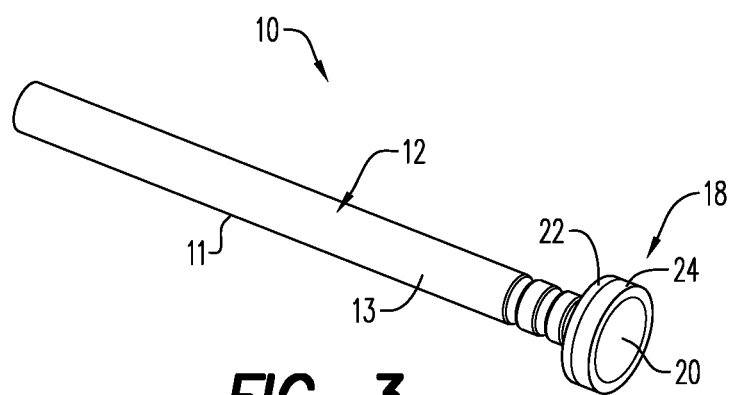
FIG. 3 is a perspective view of the detonator according to FIG. 2.

Now referring to FIGS. 2 and 3 such a detonator 10 incudes a detonator shell 12 and a detonator head 18 and is configured for being electrically contactably received within a perforating gun assembly 40 (see, for instance, FIG. 4) without using a wired electrical connection directly to the detonator. Rather, a single line-out wire (not shown) is connected to the detonator positioning assembly as described in more detail hereinbelow.

Only a portion of the perforating gun assembly 40/adjacent perforating gun assembly 40' is depicted herein, including a perforating gun body or barrel or carrier or housing 42, 42' respectively for housing the various components of the assembly. Also shown is a distal end of a typical tandem seal adapter or tandem sub 44, in which a bulkhead assembly 46 is shown assembled within the perforating gun assembly 40. The tandem sub/seal adapter 44 is configured to seal inner components within the perforating gun housing 42 from the outside environment using sealing means. The tandem seal adapter 44 seals adjacent perforating gun assemblies 40, 40' (FIG. 10) from each other, and houses the bulkhead assembly 46.

Figure 4:
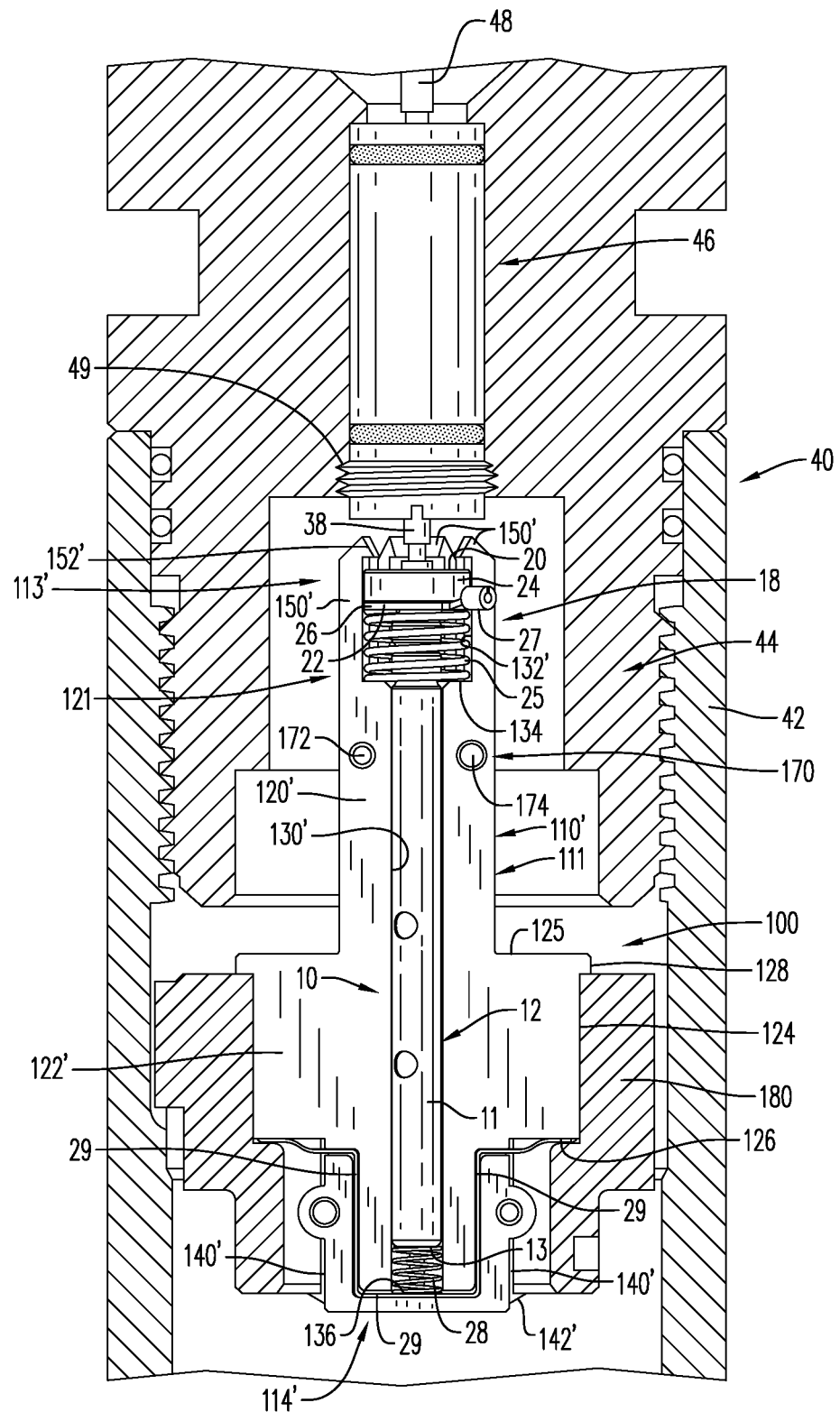
FIG. 4 is a partial semi-cross-sectional side perspective view of a perforating gun assembly including the detonator of FIGS. 2-3 seated within a detonator positioning device in which the detonator positioning device includes a multi-part cylindrical body according to an embodiment.
Figure 5:
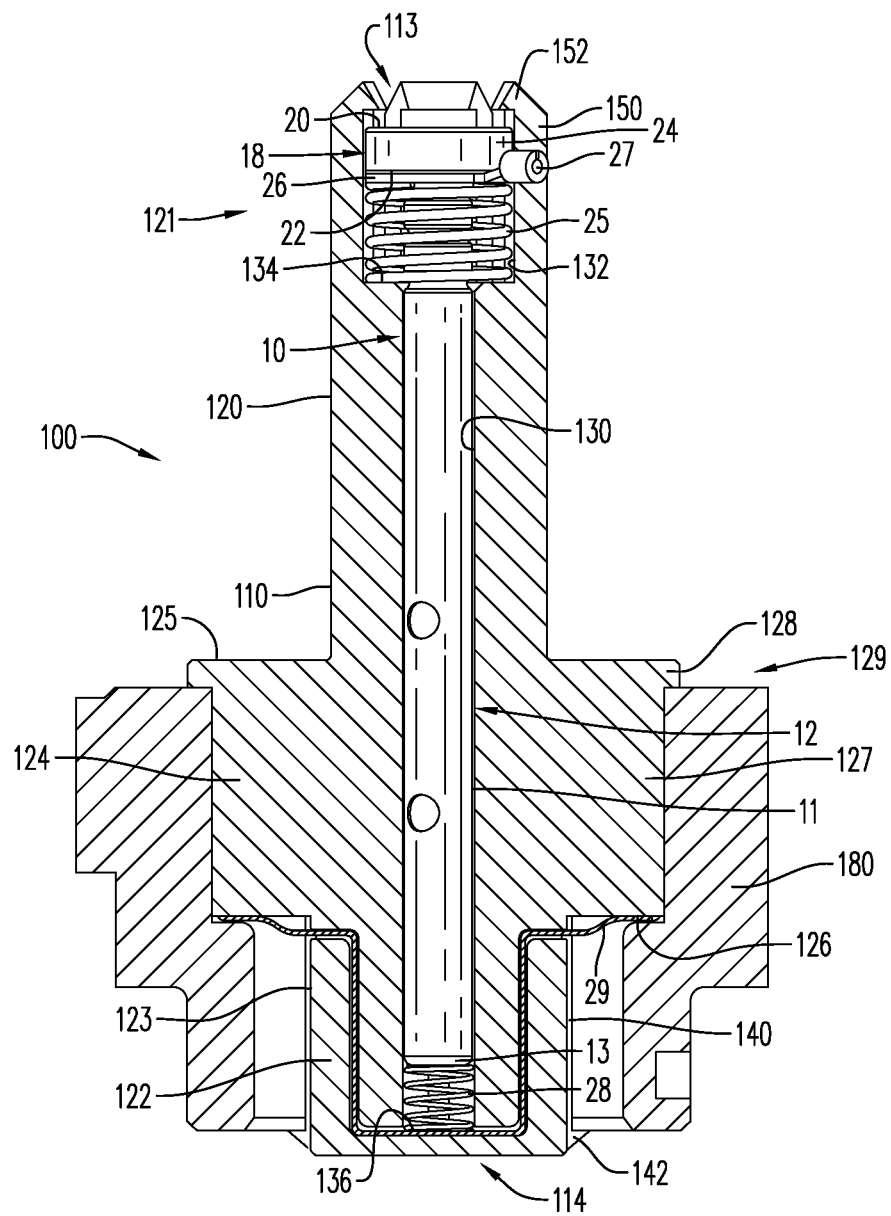
FIG. 5 is a cross-sectional side view of the detonator positioning device formed as a unitary member according to an embodiment.
Figure 10:
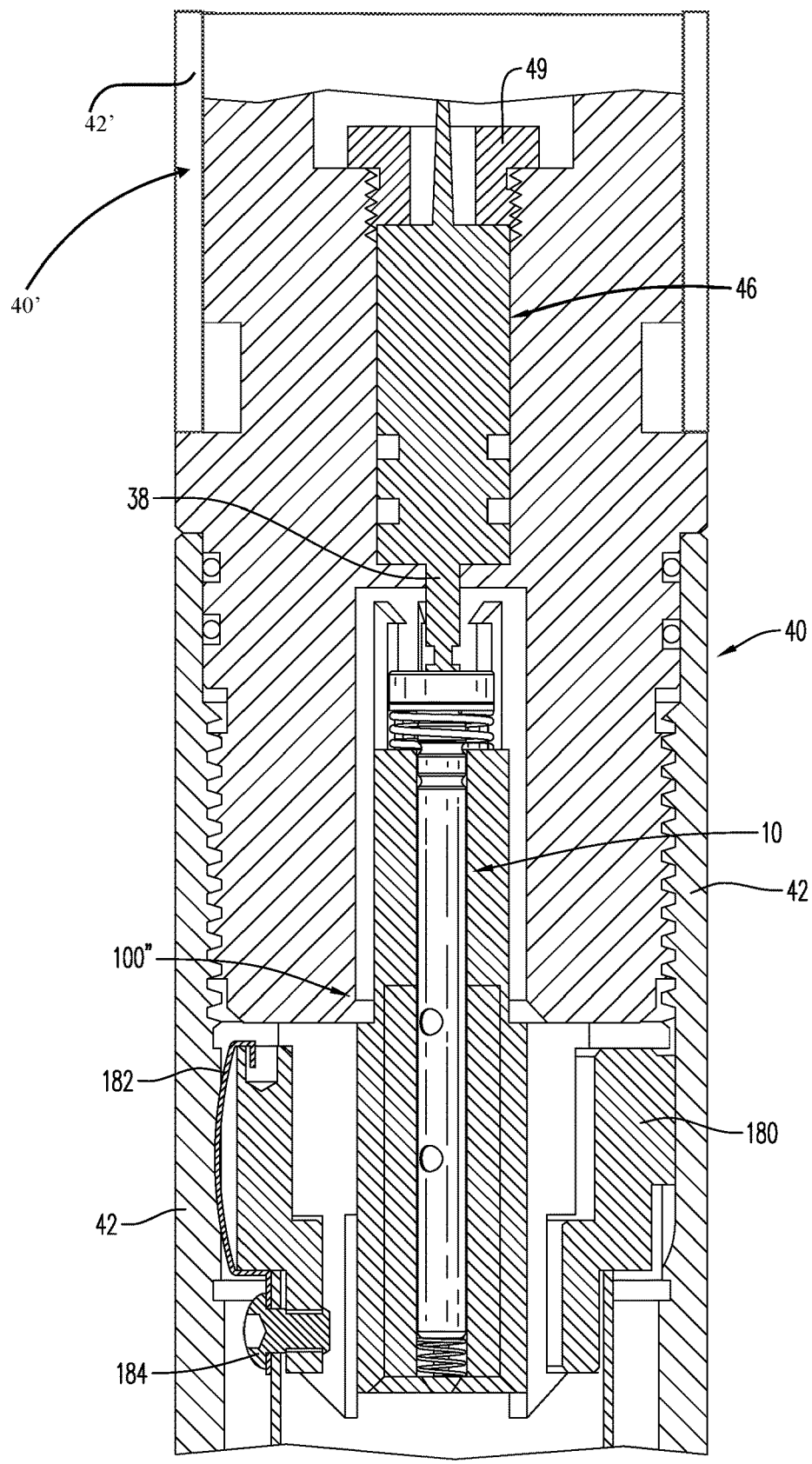
FIG. 10 is a partial cross-sectional view of another embodiment of the detonator positioning device assembly within a perforating gun assembly.

The bulkhead assembly 46 functions to relay a line-in contact-initiating pin 38 for wirelessly electrically contacting a line-in portion 20 of the detonator head 18 as described in greater detail hereinbelow. As shown in FIG. 4, for instance, bulkhead wires 48 are depicted with a coating or insulating member, typically using heat shrinking, over the wires 48 for supplying current to the bulkhead assembly 46. With reference to FIGS. 4 and 10, a bulkhead retaining mechanism 49 is provided to secure the bulkhead assembly 46 within the tandem sub 44. In the embodiment of FIG. 4, the retaining mechanism 49 abuts the end of the bulkhead assembly 46 from which the line-in contact-initiating pin 38 extends, while in the embodiment depicted in FIG. 10, the retaining mechanism 49 abuts the opposite end of the bulkhead assembly 46.

The detonator shell 12 of the detonator 10 useful herein is configured as a housing or casing 11, typically a metallic housing, which houses at least a detonator head plug 14, a fuse head 15, an electronic circuit board 16 and explosive components 19. The fuse head 15 could be any device capable of converting an electric signal into an explosion. As shown in FIG. 2, the detonator shell 12 is shaped as a hollow cylinder. The electronic circuit board 16 is connected to the fuse head 15 and is configured to allow for selective detonation of the detonator 10. The electronic circuit board 16 is configured to wirelessly and selectively receive an ignition signal I, (typically a digital code uniquely configured for a specific detonator), to fire the perforating gun assembly 40. By "selective" what is meant is that the detonator 10 is configured to receive one or more specific digital sequence(s), which differs from a digital sequence that might be used to arm and/or detonate another detonator in a different, adjacent perforating gun assembly, for instance, a train of perforating gun assemblies. So, detonation of the various assemblies does not necessarily have to occur in a specified sequence. Any specific assembly can be selectively detonated. In an embodiment, the detonation occurs in a bottom-up sequence.

The detonator head 18 extends from one end of the detonator shell 12, and includes more than one electrical contacting component including an electrically contactable line-in portion 20 and an electrically contactable line-out portion 22. According to one embodiment, the detonator head 18 may also include an electrically contactable ground portion 13 (not shown). In an embodiment, the detonator head 18 may be disk-shaped. In another embodiment, at least a portion of the detonator housing 11 is configured as the ground portion 13. The line-in portion 20, the line-out portion 22 and the ground portion 13 are configured to replace the wired connection of the prior art wired detonator 60 and to complete the electrical connection merely by contact with other electrical contacting components. In this way, the line-in portion 20 of the detonator 10 replaces the signal-in wire 61 of the wired detonator 60, the line-out portion 22 replaces the signal-out wire 60 and the ground portion 13 replaces the ground wire 63. Thus, when placed into a detonator positioning device 100 (see, for instance, FIG. 4) as discussed in greater detail below, the line-in portion 20, the line-out portion 22 and the ground portion 13 make an electrical connection by merely making contact with corresponding electrical contacting components (also as discussed in greater detail below). That is, the detonator 10 is wirelessly connectable only by making and maintaining electrical contact of the electrical contacting components to replace the wired electrical connection and without using a wired electrical connection.

The detonator head 18 also includes an insulator 24, which is positioned between the line-in portion 20 and the line-out portion 22. The insulator 24 functions to electrically isolate the line-in portion 20 from the line-out portion 22. Insulation may also be positioned between other lines of the detonator head. As discussed above and in an embodiment, it is possible for all of the contacts to be configured as part of the detonator head 18 (not shown), as found, for instance, in a banana connector used in a headphone wire assembly in which the contacts are stacked longitudinally along a central axis of the connector, with the insulating portion situated between them.

In an embodiment, a capacitor 17 is positioned or otherwise assembled as part of the electronic circuit board 16. The capacitor 17 is configured to be discharged to initiate the detonator 10 upon receipt of a digital firing sequence via the ignition signal I, the ignition signal being electrically relayed directly through the line-in portion 20 and the line-out portion 22 of the detonator head 18. In a typical arrangement, a first digital code is transmitted down-hole to and received by the electronic circuit board. Once it is confirmed that the first digital code is the correct code for that specific detonator, an electronic gate is closed and the capacitor is charged. Then, as a safety feature, a second digital code is transmitted to and received by the electronic circuit board. The second digital code, which is also confirmed as the proper code for the particular detonator, closes a second gate, which in turn discharges the capacitor via the fuse head to initiate the detonation.

In an embodiment, the detonator 10 may be fluid disabled. "Fluid disabled" means that if the perforating gun has a leak and fluid enters the gun system then the detonator is disabled by the presence of the fluid and hence the explosive train is broken. This prevents a perforating gun from splitting open inside a well if it has a leak and plugging the wellbore, as the hardware would burst open. In an embodiment, the detonator 10 is a selective fluid disabled electronic (SFDE) detonator.

The detonator 10 according to an embodiment can be either an electric or an electronic detonator. In an electric detonator, a direct wire from the surface is electrically contactingly connected to the detonator and power is increased to directly initiate the fuse head. In an electronic detonator, circuitry of the electronic circuit board within the detonator is used to initiate the fuse head.

The detonator 10 may be immune to stray current or voltage and/or radiofrequency (RF) signals to avoid inadvertent firing of the perforating gun. Thus, the assembly is provided with means for ensuring immunity to stray current or voltage and/or RF signals, such that the detonator 10 is not initiated through random radio frequency signals, stray voltage or stray current. In other words, the detonator 10 is configured to avoid unintended initiation.

The detonator 10 is configured to be electrically contactingly received within the detonator positioning device 100, which is seated or positioned within the perforating gun assembly 40, without using a wired electrical connection to the detonator 10 itself, as shown in FIGS. 4, 5, 7-9 and 10.

Figure 6:
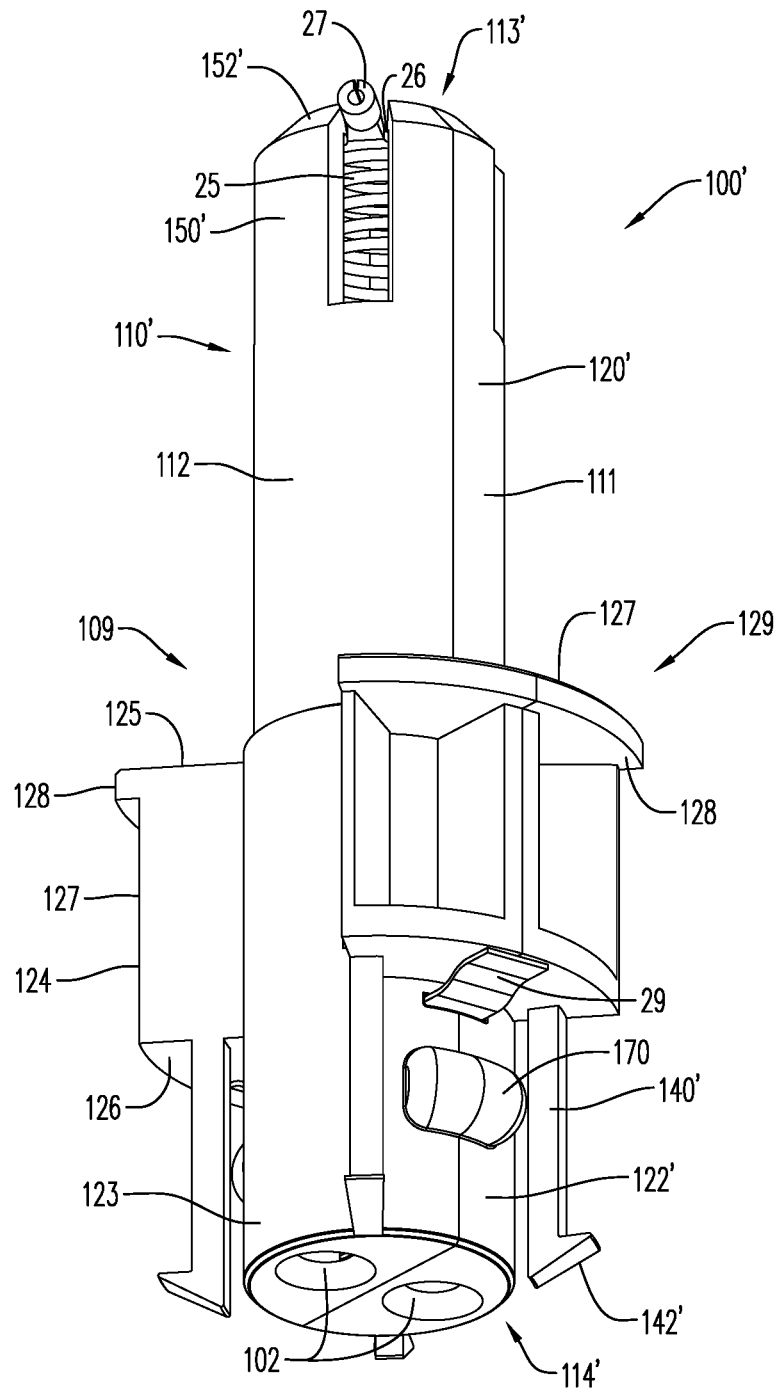
FIG. 6 is a perspective view of the detonator positioning device including a multi-part cylindrical body of FIG. 4 according to an embodiment.
Figure 7:
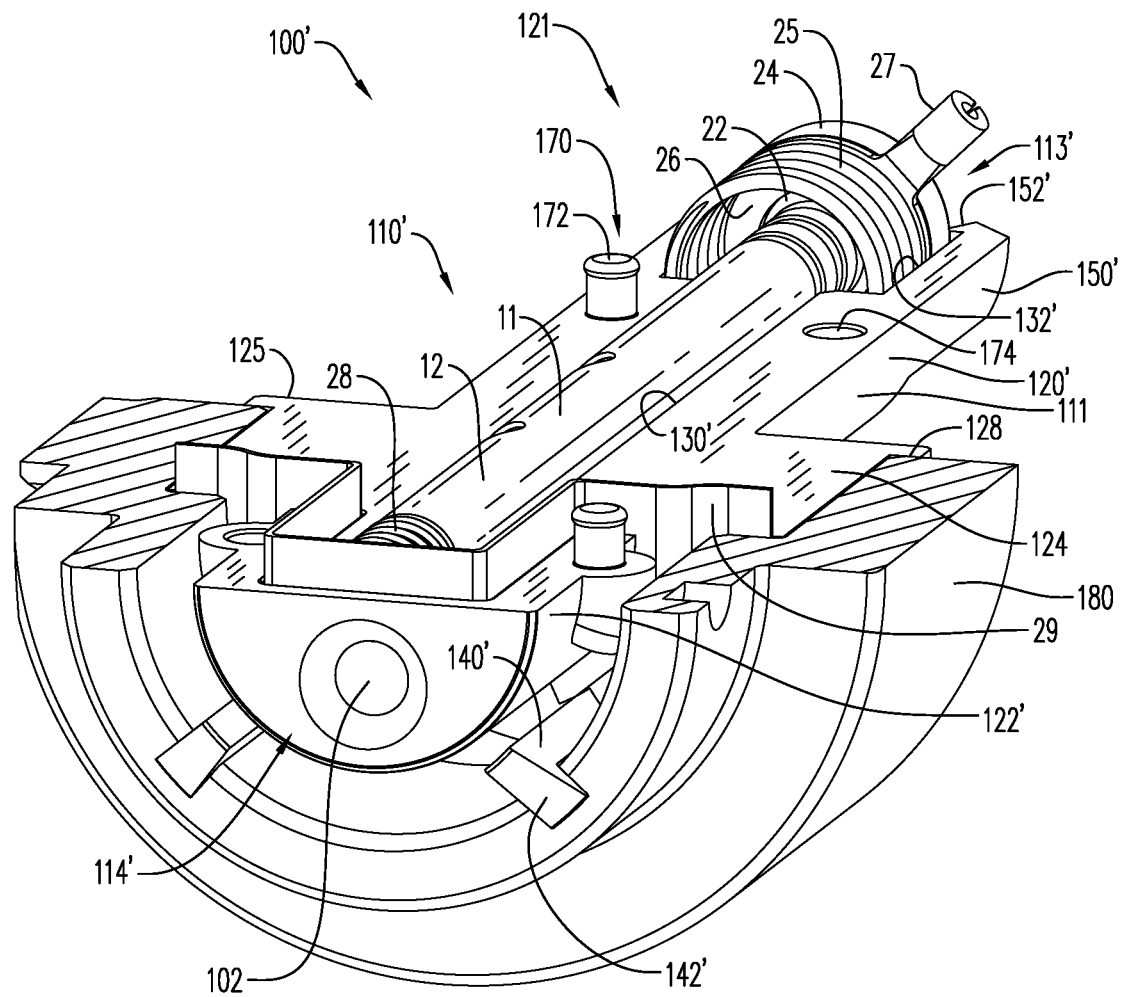
FIG. 7 is a perspective view of one part of the detonator positioning device of FIG. 6 positioned within an end plate according to an embodiment.
Figure 8:
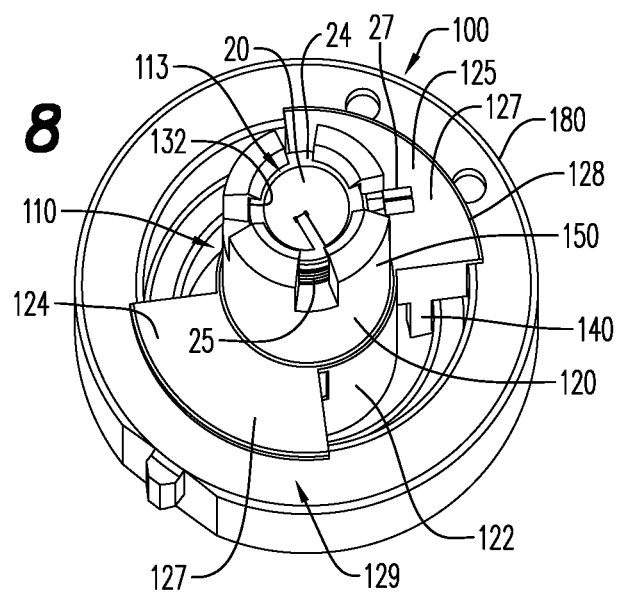
FIG. 8 is a forward end perspective view of the detonator positioning device according to an embodiment.
Figure 9:
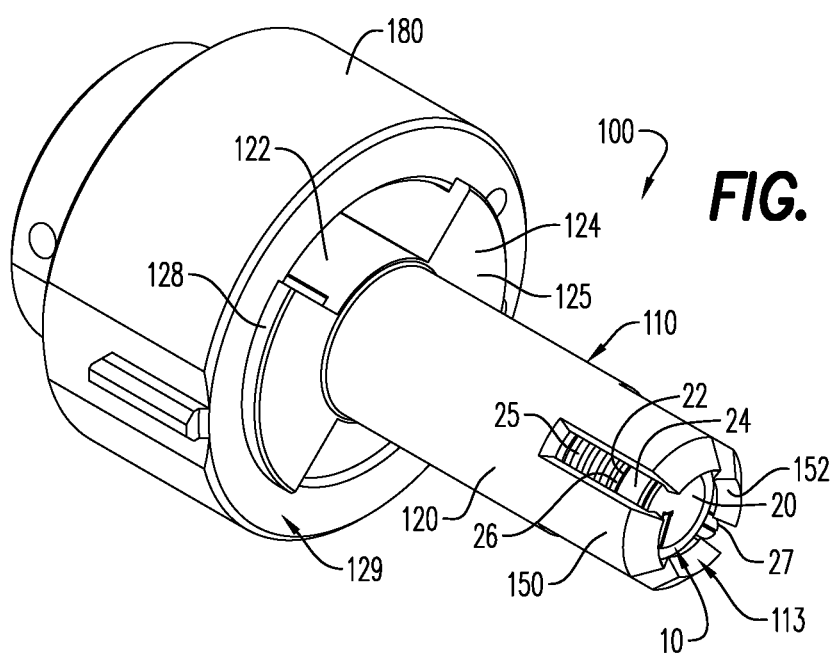
FIG. 9 is another perspective view of the detonator positioning device tilted at an angle from FIG. 8 according to an embodiment.

In an embodiment and as shown in FIGS. 4, 6 and 7, the detonator positioning device 100 includes a cylindrical body 110' depicted as a multi-part member, that is a body that is formed using a plurality of parts or sections, which may facilitate ease of assembly. With reference to the embodiment of FIG. 5, the cylindrical body 110 may also be provided as a unitary body, one that is formed as a whole, for instance by machining or molding processes known by those of ordinary skill in the art. As used herein, the prime symbol ' in the various figures designates the difference between embodiments of the unitary body (no prime used) as compared to features of the multi-part body (prime used), and will not generally be used in the description. As an example, with reference to a central bore 130, the central bore will be depicted as central bore 130' in the embodiment wherein multiple parts are used to form the body 110', while the central bore 130 (without the prime) will be used to depict the bore of the unitary body 100. In an embodiment and with reference to, for instance, FIG. 7, one or more passages 102 are provided in the closed end of the cylindrical body 110 to accommodate passage of a detonating cord (not shown) positioned within the detonator positioning device 100.

With reference again in particular to FIGS. 4-9, the cylindrical body 110 includes an open end 113, a closed end 114, and a central bore 130 adapted for receiving the detonator 10. The cylindrical body 110 also includes a plurality of portions, including at least a first portion 120 and a second portion 122, and in an embodiment a third portion 124, which will be discussed in greater detail below. The central bore 130 extends along at least some of a length of the cylindrical body 110, and typically includes an enlarged bore portion 132 adjacent the open end 113 of the cylindrical body 110. The enlarged bore portion 132 is adapted to receive the head 18 portion of the detonator 10, while the central bore 130 is adapted to receive the housing 11 portion of the detonator 10. In an embodiment, the enlarged bore portion 132 is positioned within the first portion 120 of the cylindrical body 110 and the central bore 130 extends along a majority of the length of the cylindrical body 110. In an embodiment, the enlarged bore portion 132 and the detonator head 18 are complementarily sized and shaped to receive and seat/be received and seated, respectively, in at least a semi-fixed position within the detonator positioning device 100.

In an embodiment, a plurality of arms 150 extend toward the open end 113 of the cylindrical body 110 and at least partially enclose the enlarged bore portion 132 of the central bore 130. In this way, each of the plurality of arms 150 is adapted to retain, hold or otherwise embrace the detonator head 18 portion of the detonator 10 when the detonator 10 is positioned within the enlarged bore portion 132 of the central bore 130. Typically, the arms 150 are made of a flexible and resilient material that is capable of being bent or otherwise moved circumferentially outward, yet return to their original position once the movement force has been removed, (e.g. once the detonator is positioned within the detonator positioning device 100). Thus, the arms 150 will enclose and typically contact at least a peripheral surface of the head 18 of the detonator 10. Although the plurality of arms 150 are depicted as having four arms, it would be understood that more or less arms may be sufficient to perform the stated function, i.e., to retain the detonator head. For instance, the plurality of arms 150 could include 2, 3, 4, 5, 6, 7, 8 or more arms. As shown in FIGS. 4-9 and in an embodiment, the arms may include a retainer 152 positioned at a distal end of the arms to assist in retaining and maintaining the head 18 of the detonator 10 within the detonator positioning device 100. As shown herein, the detonator head 18 is slidably received within the enlarged bore portion 132, meaning the detonator head 18 is capable of sliding along at least a portion of the length of the enlarged bore portion 132 created by the arms 150. In an embodiment, the plurality of arms 150 form at least a portion of a forward end 121 of the first portion 120 of the cylindrical body 110.

Although not shown, it is possible to provide a window or opening in the cylindrical body 110 of the detonator positioning device 100 to facilitate visual verification of proper seating of the detonating cord (not shown), once the detonating cord has been connected to the assembly through the passage 102.

Turning to the other end of the detonator positioning device 100, a plurality of legs 140 are adapted to assist in positioning the device 100 within the perforating gun assembly 40. In the embodiment shown in FIGS. 4-8, the plurality of legs 140 extend from the cylindrical body 110 toward the closed end 114 of the cylindrical body 110. Similar to the arms 150, the legs 140 may be made from a resilient material, and typically include protrusions 142 at the distal ends thereof adapted for positioning and holding the device 100 in place. In an embodiment, each protrusion 142 extends away from the cylindrical body 110.

Although the plurality of legs 140 are depicted as having four legs, it would be understood that more or less legs may be sufficient to perform the stated function, i.e., to position the detonator positioning device within a perforating gun assembly. For instance, the plurality of legs 140 could comprise 3, 4, 5, 6, 7, 8 or more legs. Having more legs (or arms as referenced above) means each individual leg/arm is ultimately thinner than if fewer legs/arms are used. Similarly, thinner legs/arms means the individual legs/arms are less rigid, so there will ultimately be a trade-off in number of legs/arms selected between rigidity and/or flexibility of the detonator positioning device and the ability to stabilize the detonator positioning device within the perforating gun assembly and/or retain the detonator head, as the case may be.

Further, in an embodiment, each of the plurality of arms 150 and the plurality of legs 140 are adapted to provide a snap fit upon insertion of the detonator 10 within the central bore 130 and insertion of the cylindrical body 110 within the perforating gun assembly 40.

As mentioned above, a third portion 124 may also be formed as a portion of the cylindrical body 110. As shown in FIGS. 4-9 and in an embodiment, the third portion 124 is formed integrally as part of the second portion 122, while it is contemplated that the third portion 124 could be formed as a separate unit that is attached to the cylindrically body 110. The third portion 124 has a forward face 125 and a rearward face 126, and as shown in this embodiment, the plurality of legs 140 extend from the rearward face 126 of the third portion 124. As depicted herein, the third portion 124, extends circumferentially from an outer surface 123 of the second portion 122 and the third portion 124 is discontinuous about the outer surface 123 of the second portion 122 of the cylindrical body 110, thus forming a plurality of sections 127. Such an arrangement typically minimized overall weight and associated costs with fabricating the unit, while maintaining sufficient structural integrity to perform the stated functions. Further as depicted in this embodiment, the third portion 124 includes a circumferentially-extending lip 128 at a distal end 129 of the third portion 124. In this arrangement, the distal end 129 is positioned opposite the plurality of legs 140. The lip 128 is further adapted for positioning the detonator positioning device 100 by working in concert with the plurality of legs 140 to hold the detonator positioning device 100 in place within the perforating gun assembly 40.

As stated above, the central bore 130 is adapted to receive and retain the detonator 10, wherein the central bore 130 extends from the open end 113 to the closed end 114 of the cylindrical body 110, and the enlarged bore portion 132 is positioned adjacent the open end 113. Thus, when the detonator 10 is positioned within the central bore 110 of the detonator positioning device 100, the detonator housing 11 extends along a length of the central bore 130, while the detonator head 18 is received within the enlarged bore portion 132.

In an embodiment, a line-out connector biasing member 25 is positioned or otherwise situated within the central bore 130 of the cylindrical body 110, at a base 134 of the enlarged bore portion 132, while a ground connector biasing member 28 is positioned or otherwise situated within the central bore 130 of the cylindrical body 110, at a base 136 of the central bore 130. Thus, the ground connector biasing member 28 is positioned within the central bore 130 between the detonator housing 11 of the detonator 10 and the closed end 114 of the cylindrical body 110. In addition, a terminal 26 is typically positioned adjacent the line-out connector biasing member 25.

In an embodiment, the terminal 26 is formed as a semi-round metallic material, with a slotted nipple 27 extending from an outer circumferential surface of the terminal 26. The slotted nipple 27 is adapted for connection to the single electrical line-out wire needed to complete the electrical connection for this assembly (not shown). Although a slotted nipple 27 is depicted, it will be understood by those of ordinary skill in the art that other mechanisms may be provided to create the electrical connection between the single wire and the terminal 26.

The line-out connector biasing member 25 and the ground connector biasing member 28 may be formed from a spring-like material for assisting in maintenance of physical and electrical contact between the line-in contact-initiating pin 38 extending from the bulkhead assembly 46, and may also be formed of materials suitable to facilitate electrical connectivity. Typically, these components are also metallic, that is to say they are formed from an electrically conductive metal material.

Once received within the central bore 130, therefore, the detonator 10 is electrically contactingly connected to the terminal 26 that is positioned between the line-out portion 22 of the detonating head 18 of the detonator 10 and the line-out connector biasing member 25. Thus, once the detonator 10 is positioned within the central bore 130, and the line-in contact-initiating pin 38 of the bulkhead assembly 46 makes contact with, and thus electrically contactably connects to the line-in portion 20 of the detonator head 18. The line-out connector biasing member 25 will thus compress, causing the line-out portion 22 of the detonator head 18 to electrically contactably connect with the terminal 26. The grounding connection will be discussed in more detail hereinbelow.

With reference to the closed end 114 of the detonator positioning device 100 and in an embodiment, a grounding strip or wire 29 is provided for completing the electrical connection and is also typically formed from an electrically conductive metal material. In an embodiment, the grounding strip 29 is embedded in the closed end 114 of the cylindrical body 110. As shown in the embodiment of FIGS. 4-7, the grounding strip 29 extends from one side of the cylindrical body 110 through to the opposite side of the cylindrical body 110 in a way that a central portion of the grounding strip 29 is positioned adjacent one end of the ground connector biasing member 28, opposite from the housing 11 of the detonator 10. Thus, the ends of the grounding strip 29 extend beyond the outer surface of the cylindrical body 110. When the detonator 10 is positioned within the central bore 130 of the detonator positioning device 100, and the detonator 10 is compressed by the contact of the bulkhead assembly 44, the ground connector biasing member 28 compresses and electrically contactably connects the ground portion 13 of the housing 11 with the ground connector biasing member 28 and the grounding strip 29, which completes a ground loop via connection with the perforating gun housing 42. As shown in FIG. 4, the grounding strip is deformed upon insertion of the detonator positioning device 100 into an end plate 180, the entire assembly of which is inserted within the perforating gun body 42, thus completing the ground loop/connection.

As mentioned above, and with particular reference to FIGS. 4, 6 and 7, the cylindrical body 110 may be formed as a multi-part cylindrical body 110' including at least a first part 111 and a second part 112. As shown herein, the first part 111 of the cylindrical body 110 can be removably connected, (or otherwise joined, fastened, united) to the second part 112 of the cylindrical body 110' to form an assembled cylindrical body 109. In this way, each of the first part 111 and the second part 112 include at least a first portion 120' and a second portion 122', the assembled cylindrical body 109 comprising an open end 113', a closed end 114', and a central bore 130' adapted for receiving the detonator 10, the central bore 130' extending along at least some of a length of the assembled cylindrical body 109, the central bore 130' including an enlarged bore portion 132' adjacent the open end 113' of the assembled cylindrical body 109. In this embodiment, a plurality of arms 150' extend toward the open end 113' of the assembled cylindrical body 109 and at least partially enclose the enlarged bore portion 132' of the central bore 130'. Further, each of the plurality of arms 150' include a retainer 152' adapted to retain the detonator head 18 of the detonator 10 positioned within the enlarged bore portion 132' of the central bore 130'. In an embodiment, a plurality of legs 140' extend from the assembled cylindrical body 109 and toward the closed end 114' of the assembled cylindrical body 109, and each of the plurality of legs 140' include a protrusion 142' extending away from the assembled cylindrical body 109 and adapted for positioning the assembled cylindrical body 109 in the perforating gun assembly 40.

Since the assembled cylindrical body 109 according to this embodiment requires assembly in the field, a plurality of couplers 170 are provided that are adapted for attaching the first part 111 of the assembled cylindrical body 109 to the second part 112 of the assembled cylindrical body 109. It would be understood by one of ordinary skill in the art that it is possible to attach the first part 111 to the second part 112 by any number of fasteners 172, including screws, bolts/nuts and the like that may be received in a socket or cavity 174 through threading, frictional fit and the like. As shown best in FIG. 7 and in an embodiment, the fastener 172 is a protrusion including a distal nob extending from the first part 111, which is matingly inserted into an oppositely positioned cavity 174 of the second part 112 (not shown). In an embodiment, the fastener 172 snap fits into the cavity 174.

In an embodiment, the first part 111 and the second part 112 may be configured as symmetrical or non-symmetrical halves.

According to an aspect the perforating gun assembly 40 and a method for assembling the perforating gun assembly 40 including a wireless detonator 10 and detonator positioning device 100 as described hereinabove is provided.

In an aspect, the method of assembling the perforating gun assembly 40 while using a semi-wired electrical connection includes at least the following steps: positioning the detonator positioning device 100 within the perforating gun assembly 40, the detonator positioning device 100 including the central bore 130; positioning the ground connector biasing member 28 at the base 136 of the central bore 130; positioning the line-out connector biasing member 25 at the base 134 of the enlarged portion 132 of the central bore 130; positioning the terminal 26 for receiving the single line-out wire adjacent the line-out connector biasing member 25; positioning the wireless detonator 10 within the central bore 130 such that the housing 11 of the detonator 10 extends along at least a portion of the central bore 130 and the ground portion 13 of the housing 11 electrically contacts the ground connector biasing member 28, and positioning the head 18 of the detonator 10 within the enlarged portion 132 of central bore 130 such that the line-out portion 22 of the detonator 10 electrically contacts the terminal 26, and the line-in contact-initiating pin 38 electrically contacts the line-in portion 20 of the detonator 10.

According to an aspect, the step of positioning the detonator positioning device 100 within the perforating gun assembly 40 includes positioning the detonator positioning device within a support member or end plate 180, as seen, for instance, FIGS. 4, 5 and 7-10, and as discussed briefly above. As shown herein the end plate 180 has an inner cavity that is sufficiently sized to receive the closed end 114 of the cylindrical body 110, and in particular to receive at least the second portion 122 (and/or the third portion 124) by interlocking and/or snap-fit action with the plurality of legs 140 at a rearward end of the endplate 180 (see FIGS. 4, 5 and 7) and by abutting the circumferentially-extending lip against the outer surface of the end plate 180 (see in particular FIGS. 8 and 9) at the opposite end of the end plate 180. Similarly, the outer dimension or exterior surface of the end plate 180 is sufficiently sized to be received within the perforating gun barrel 42. Although not specifically shown, it will be understood by one of ordinary skill in the art that it is possible to form various members and components described herein as integrated units.

Figure 11:
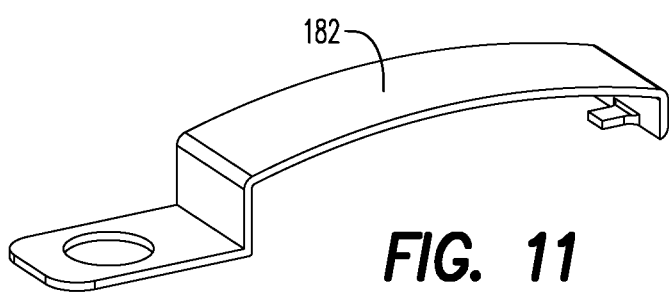
FIG. 11 is a perspective view of a ground rib according an embodiment.

Turning to the embodiment found in FIG. 10, a separate component is provided to facilitate the ground loop discussed hereinabove. As shown herein, a grounding rib 182 is attached to the exterior surface of the end plate 180 to complete the ground loop upon positioning of the detonator positioning device 100 within the perforating gun assembly 40. In an embodiment, the grounding rib 182 is formed as a long, narrow, thin, semi-curved, flexible and resilient, metallic member, as seen best in FIG. 11. As shown herein, a securing mechanism 184 is provided for attaching the grounding rib 182 to the exterior surface of the end plate 180. Thus, when the assembly is inserted into the perforating gun barrel 42, the grounding rib 182 flexed circumferentially inwardly to complete the ground loop.

As used herein, "hold" means to enclose within bounds, to limit or hold back from movement or to keep in a certain position. The detonator positioning device 100 is positioned within the perforating gun assembly 40 and functions to receive and hold in place the detonator 10 according to an embodiment. In addition, the detonator positioning device 100 also functions to provide electrical contacting components for wirelessly-connectably electrically receiving the detonator 10, while providing for a single wired connection to the detonator positioning device 100 itself.

The components and methods illustrated are not limited to the specific embodiments described herein, but rather, features illustrated or described as part of one embodiment can be used on or in conjunction with other embodiments to yield yet a further embodiment. It is intended that the device and method include such modifications and variations. Further, steps described in the method may be utilized independently and separately from other steps described herein.

While the device and method have been described with reference to a preferred embodiment, it will be understood by those skilled in the art that various changes may be made and equivalents may be substituted for elements thereof without departing from the scope contemplated. In addition, many modifications may be made to adapt a particular situation or material to the teachings found herein without departing from the essential scope thereof.

In this specification and the claims that follow, reference will be made to a number of terms that have the following meanings. The singular forms "a," "an" and "the" include plural referents unless the context clearly dictates otherwise. Furthermore, references to "one embodiment," "some embodiments," "an embodiment" and the like are not intended to be interpreted as excluding the existence of additional embodiments that also incorporate the recited features. Terms such as "first," "second," "forward," "rearward," etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of."

Advances in science and technology may make equivalents and substitutions possible that are not now contemplated by reason of the imprecision of language; these variations should be covered by the appended claims. This written description uses examples to disclose the device and method, including the best mode, and also to enable any person of ordinary skill in the art to practice the device and method, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A detonator positioning device comprising:
    a body configured for positioning a detonator, the body comprising a first end, a second end, and a central bore extending between the first end and the second end; and
    a plurality of electrical contacts positioned in the body, wherein
        the entire body is positioned in a perforating gun housing such that each electrical contact of the plurality of electrical contacts is configured to form an electrical connection within the perforating gun housing by contact, without using a wired electrical connection,
        an explosive component of the detonator is positioned along a longitudinal center axis of the perforating gun housing, and
        at least one electrical contact of the plurality of electrical contacts is a pin connector of a bulkhead assembly that is partially positioned in the perforating gun housing and partially positioned in a tandem seal adapter, the pin connector being in communication with the explosive component of the detonator.

2. The detonator positioning device of claim 1, wherein the electrical connection is formed by an electrical contact of the plurality of electrical contacts contacting other electrical contacting components in the perforating gun housing.

3. The detonator positioning device of claim 1, wherein the body is configured to facilitate the electrical connection within the perforating gun housing and the electrical connection places an electrical contact of the plurality of electrical contacts in communication with a relay to an adjacent perforating gun housing.

4. The detonator positioning device of claim 1, wherein the body comprises:
    a first part; and
    a second part,
    wherein the first part and the second part are configured as halves of the body.

5. The detonator positioning device of claim 1, wherein the detonator comprises a housing configured to house the explosive component.

6. The detonator positioning device of claim 1, wherein the detonator is a wireless detonator.

7. A detonator positioning device comprising:
    a body configured for positioning an explosive component of a detonator, the body comprising a central bore positioned in the body and the explosive component being positioned in the central bore; and
    a first electrical contact and a second electrical contact, wherein at least one of the first electrical contact and the second electrical contact includes a spring-loaded electrical contact, and the first electrical contact and the second electrical contact are positioned in at least a portion of the body,
    wherein the spring-loaded electrical contact includes a pin connector of a bulkhead assembly, the pin connector being in communication with the detonator, and the bulkhead assembly being partially positioned in a perforating gun housing and partially positioned in a tandem seal adapter connected to the perforating gun housing, at least a first portion of the body is positioned in the perforating gun housing and the first electrical contact or the second electrical contact forms an electrical connection within the perforating gun housing by contact, without using a wired electrical connection, and at least a second portion of the body is positioned in the tandem seal adapter, and the body is configured to facilitate the electrical connection within the perforating gun housing and the electrical connection places the first electrical contact or the second electrical contact in communication with a relay to an adjacent perforating gun housing; and the entire explosive component of the detonator is positioned within the perforating gun housing such that the explosive component is on a center axis of the perforating gun housing.

8. The detonator positioning device of claim 7, wherein the spring-loaded electrical contact comprises:

an electrically contactable line-in portion configured to form the electrical connection with the bulkhead assembly.

9. The detonator positioning device of claim 7, wherein the body comprises:

a first part; and a second part, wherein the first part and the second part are configured as halves of the body.

10. The detonator positioning device of claim 7, wherein the detonator comprises a housing configured to house the explosive component.

11. A perforating gun assembly comprising:

a perforating gun housing;

a detonator positioning device, wherein at least a portion of the detonator positioning device is positioned within the perforating gun housing, the detonator positioning device comprising:

a body configured for positioning an explosive component of a detonator, the body comprising a central bore extending between a first end and a second end, and a plurality of electrical contacts positioned in the body, the electrical contacts being in communication with an electronic circuit board configured to initiate the explosive component of the detonator, wherein the electronic circuit board is positioned entirely in the perforating gun housing, each electrical contact of the plurality of electrical contacts of the detonator positioning device forms an electrical connection within the perforating gun housing by contact with a corresponding electrical contacting component, without using a wired electrical connection, and the explosive component is positioned along a longitudinal center axis of the perforating gun housing;

a tandem seal adapter connected to a first end of the perforating gun housing; and a bulkhead assembly partially positioned in the perforating gun housing and partially positioned in the tandem seal adapter, the bulkhead assembly including a pin connector, wherein at least one electrical contact of the plurality of electrical contacts is the pin connector of the bulkhead assembly, and the pin connector is in communication with the detonator, and wherein the detonator positioning device aligns the detonator with the bulkhead assembly, such that the detonator electrically contactably forms an electrical connection within the bulkhead assembly.

12. The perforating gun assembly of claim 11, further comprising:

a first electrically contactable biasing member positioned in the bore; and a second electrically contactable biasing member adjacent the first end or the second end of the body.

13. The perforating gun assembly of claim 12, wherein the first electrically contactable biasing member comprises a line-out connector, and the second electrically contactable biasing member comprises a ground connector.

14. The perforating gun assembly of claim 11, wherein one electrical contact of the plurality of electrical contacts is an electrically contactable line-in portion, and the pin connector of the bulkhead assembly comprises a line-in contact-initiating pin, wherein the line-in contact-initiating pin contacts the line-in portion of the detonator to facilitate the electrical connection within the bulkhead assembly.

15. The perforating gun assembly of claim 11, wherein the detonator positioning device is configured to be removably positioned in the perforating gun housing, and the detonator positioning device facilitates the electrical connection within the perforating gun housing and the electrical connection places one electrical contact of the plurality of electrical contacts in communication with a relay to an adjacent perforating gun housing.

16. The perforating gun assembly of claim 11, wherein the detonator positioning device is configured to be secured in an end plate positioned in the perforating gun housing.

17. The perforating gun assembly of claim 11, wherein the detonator is a wireless detonator.

* * * * *